United States Patent
Gehrmann

(10) Patent No.: US 10,681,058 B2
(45) Date of Patent: Jun. 9, 2020

(54) SYSTEMS, METHODS, AND DEVICES TO DEFEND AGAINST ATTACKS

(71) Applicant: PCMS Holdings, Inc., Wilmington, DE (US)

(72) Inventor: Christian M. Gehrmann, Lund (SE)

(73) Assignee: PCMS Holdings, Inc., Wilmington, DE (US)

( * ) Notice: Subject to any disclaimer, the term of this patent is extended or adjusted under 35 U.S.C. 154(b) by 147 days.

(21) Appl. No.: 15/570,657

(22) PCT Filed: Apr. 29, 2016

(86) PCT No.: PCT/US2016/029921
§ 371 (c)(1),
(2) Date: Oct. 30, 2017

(87) PCT Pub. No.: WO2016/178932
PCT Pub. Date: Nov. 10, 2016

(65) Prior Publication Data
US 2018/0295101 A1  Oct. 11, 2018

Related U.S. Application Data

(60) Provisional application No. 62/155,883, filed on May 1, 2015.

(51) Int. Cl.
*H04L 29/06* (2006.01)
*H04W 4/70* (2018.01)
(Continued)

(52) U.S. Cl.
CPC .......... *H04L 63/14* (2013.01); *H04L 63/0263* (2013.01); *H04L 63/1408* (2013.01);
(Continued)

(58) Field of Classification Search
CPC . H04L 63/1408; H04L 63/1416; H04L 63/14; H04L 63/1441; H04L 63/1458
See application file for complete search history.

(56) References Cited

U.S. PATENT DOCUMENTS

| 9,774,604 B2* | 9/2017 | Zou ..................... H04L 63/0263 |
| 2011/0029644 A1* | 2/2011 | Gelvin .................. G06F 15/173 709/220 |

(Continued)

OTHER PUBLICATIONS

Cisco, "Strategies to Protect Against Distributed Denial of Service (DDoS) Attacks", Available at http://www.cisco.com/c/en/us/support/docs/security-vpn/kerberos/13634-newsflash.html , Document ID: 13634, Apr. 22, 2008, 5 pages.

(Continued)

Primary Examiner — James R Turchen
(74) Attorney, Agent, or Firm — Condo Roccia Koptiw LLP

(57) ABSTRACT

Systems, methods, and/or techniques for mitigating attacks on an IoT device at a gateway device may be provided. The gateway device may receive a communication directed to an Internet of Things (IoT) device and forward it to the IoT device. The IoT device may indicate to the gateway device that the communication is associated with an attack and send the gateway device a sleep time period and a request to change a filtering rule set at the gateway device. The gateway device may change the filtering rule set and receive another communication directed to the IoT device. If the another communication is valid based on the filtering rule set with the change and a number of valid packets is less than a threshold, and the sleep time period has expired, the gateway device may send another communication to the IoT device.

20 Claims, 22 Drawing Sheets

(51) Int. Cl.
*H04W 12/12* (2009.01)
*H04W 12/00* (2009.01)

(52) U.S. Cl.
CPC ...... *H04L 63/1416* (2013.01); *H04L 63/1441* (2013.01); *H04L 63/1458* (2013.01); *H04W 4/70* (2018.02); *H04W 12/12* (2013.01); *H04L 2463/141* (2013.01); *H04W 12/00502* (2019.01)

(56) References Cited

U.S. PATENT DOCUMENTS

| | | | | |
|---|---|---|---|---|
| 2012/0307624 | A1* | 12/2012 | Vasseur | H04L 41/0659 370/221 |
| 2013/0290305 | A1 | 10/2013 | Feng et al. | |
| 2014/0359131 | A1* | 12/2014 | Seed | H04L 67/12 709/226 |
| 2015/0007273 | A1* | 1/2015 | Lin | H04L 63/08 726/4 |
| 2015/0089572 | A1* | 3/2015 | He | H04L 63/1416 726/1 |
| 2015/0193694 | A1* | 7/2015 | Vasseur | H04L 41/16 706/12 |
| 2015/0195296 | A1* | 7/2015 | Vasseur | H04L 43/0876 726/23 |
| 2016/0007288 | A1* | 1/2016 | Samardzija | H04W 52/0229 370/311 |
| 2016/0028752 | A1* | 1/2016 | Di Pietro | H04L 63/1416 726/23 |
| 2016/0028762 | A1* | 1/2016 | Di Pietro | H04L 63/1458 726/23 |
| 2016/0078362 | A1* | 3/2016 | Christodorescu | G06F 21/566 706/12 |
| 2016/0088049 | A1* | 3/2016 | Seed | H04W 4/70 709/203 |
| 2016/0142436 | A1 | 5/2016 | Gehrmann et al. | |
| 2016/0241439 | A1* | 8/2016 | Idnani | H04L 41/0816 |
| 2016/0261465 | A1* | 9/2016 | Gupta | H04L 41/14 |
| 2016/0352685 | A1* | 12/2016 | Park | H04L 63/0245 |
| 2018/0129805 | A1* | 5/2018 | Samuel | H04W 4/70 |
| 2018/0295101 | A1* | 10/2018 | Gehrmann | H04W 12/12 |
| 2019/0081980 | A1* | 3/2019 | Luo | G06N 7/005 |

OTHER PUBLICATIONS

Fantacci et al., "A Network Architecture Solution for Efficient IOT WSN Backhauling: Challenges and Opportunities", IEEE Wireless Communications, vol. 21, No. 4, Aug. 2014, pp. 113-119.
Gehrmann et al., "SMACK: Short Message Authentication Check Against Battery Exhaustion in the Internet of Things", 12th Annual IEEE International Conference on Sensing, Communication, and Networking (SECON), Seattle, WA, Jun. 2015, pp. 274-282.
Hummen et al., "Tailoring End-to-End IP Security Protocols to the Internet of Things", 21st IEEE International Conference on Network Protocols (ICNP), Goettingen, Oct. 2013, 10 pages.
Kaufman, C., "Internet Key Exchange (IKEv2) Protocol", The Internet Engineering Task Force (IETF), Request for Comments:4306, Dec. 2005, pp. 1-99.
Rescorla et al., "Datagram Transport Layer Security Version 1.2", Internet Engineering Task Force (IETF), Request for Comments: 6347, Category: Standards Track, Jan. 2012, pp. 1-32.
Shelby et al., "The Constrained Application Protocol (CoAP)", Internet Engineering Task Force (IETF), Request for Comments: 7252, Category: Standards Track, Jun. 2014, pp. 1-112.
Tiloca et al., "On Improving Resistance to Denial of Service and Key Provisioning Scalability of the DTLS Handshake", International Journal of Information Security, Oct. 2016, 23 pages.

* cited by examiner

400

| OCTET 1 402 | | | OCTET 2 404 | OCTET 3 406 | OCTET 4 408 |
|---|---|---|---|---|---|
| VER 410 | T 412 | TKL 414 | CODE 416 | MESSAGE ID | 418 |
| REQUEST ID | | | 420 | VALIDITY CHECK | 422 |
| OPTIONS (IF ANY) | | | | | 424 |
| PAYLOAD (IF ANY) | | | | | 426 |

*FIG. 4*

SYSTEMS, METHODS, AND DEVICES TO DEFEND AGAINST ATTACKS

CROSS-REFERENCE TO RELATED APPLICATION

This application is the National Stage Entry under 35 U.S.C. § 371 Patent Cooperation Treaty Application No. PCT/US2016/029921, filed Apr. 29, 2016, which claims the benefit of U.S. Provisional Patent Application No. 62/155,883, filed May 1, 2015, the contents of which are incorporated by reference herein.

BACKGROUND

Machine to Machine (M2M) and/or Internet of Things (IoT) may be an Internet paradigm that may be used to remotely configure and control a very large number of electronic equipment (e.g., M2M).

SUMMARY

Systems, methods, and instrumentalities for mitigating attacks on an IoT device at a gateway device may be provided and/or used. For example, the gateway device may receive a first communication directed to an Internet of Things (IoT) device. The gateway device may send the communication to the IoT device. The gateway device may receive from the IoT device an indication that the communication is associated with an attack, an indication of a sleep time period associated with the IoT device, and/or a request to change a filtering rule set at the gateway device. The gateway device may make a change to the filtering rule set at the gateway device. The gateway device may receive a second communication directed to the IoT device. If the second communication is valid based on the filtering rule set with the change and the number of valid packets is less than a threshold, and the sleep time period has expired, the gateway device may send the second communication to the IoT device. If the second communication satisfies one or more conditions, the gateway device may send the second communication to the IoT device. The one or more conditions may include one or more of: that the second communication is valid based on the filtering rule set with the first change, and a number of valid packets is less than a threshold, the sleep time period has expired, or a number of valid packets is less than a threshold.

The IoT device may receive a communication from a gateway device. The IoT device may determine that the communication is associated with an attack on the IoT device, e.g., if it decides that a number of packets received by the IoT device during a time period exceeds a threshold. The IoT device may send to the gateway device an indication that the communication is associated with the attack, an indication of a sleep time period associated with the IoT device, and/or a request to change a filtering rule set at the gateway device. The IoT device may enter a sleep mode. The IoT device may not process communications from the gateway device during the sleep time period. The IoT device may enter an active mode after the sleep time period has expires. The IoT device may receive another communication from the gateway device.

If the second communication satisfies one or more conditions, the gateway device may send the second communication to the IoT device. The one or more conditions may include one or more of: the second communication being valid based on the filtering rule set with the change, the sleep time period having expired, and the number of valid packets being less than a threshold.

The summary is provided to introduce a selection of concepts in a simplified form that are further described below in the Detailed Description. This Summary is not intended to identify key features or essential features of the claimed subject matter, not is it intended to be used to limit the scope of the claimed subject matter. Furthermore, the claimed subject matter is not limited to the examples herein that may solve one or more disadvantages noted in any part of this disclosure.

BRIEF DESCRIPTION OF THE DRAWINGS

A more detailed understanding of the embodiments disclosed herein may be had from the following description, given by way of example in conjunction with the accompanying drawings.

FIG. 4 illustrates an example message format that may be used in one or more examples herein.

DETAILED DESCRIPTION

A detailed description of illustrative embodiments may now be described with reference to the various Figures. Although this description provides a detailed example of possible implementations, it should be noted that the details are intended to be exemplary and in no way limit the scope of the examples described herein.

Figure 1:
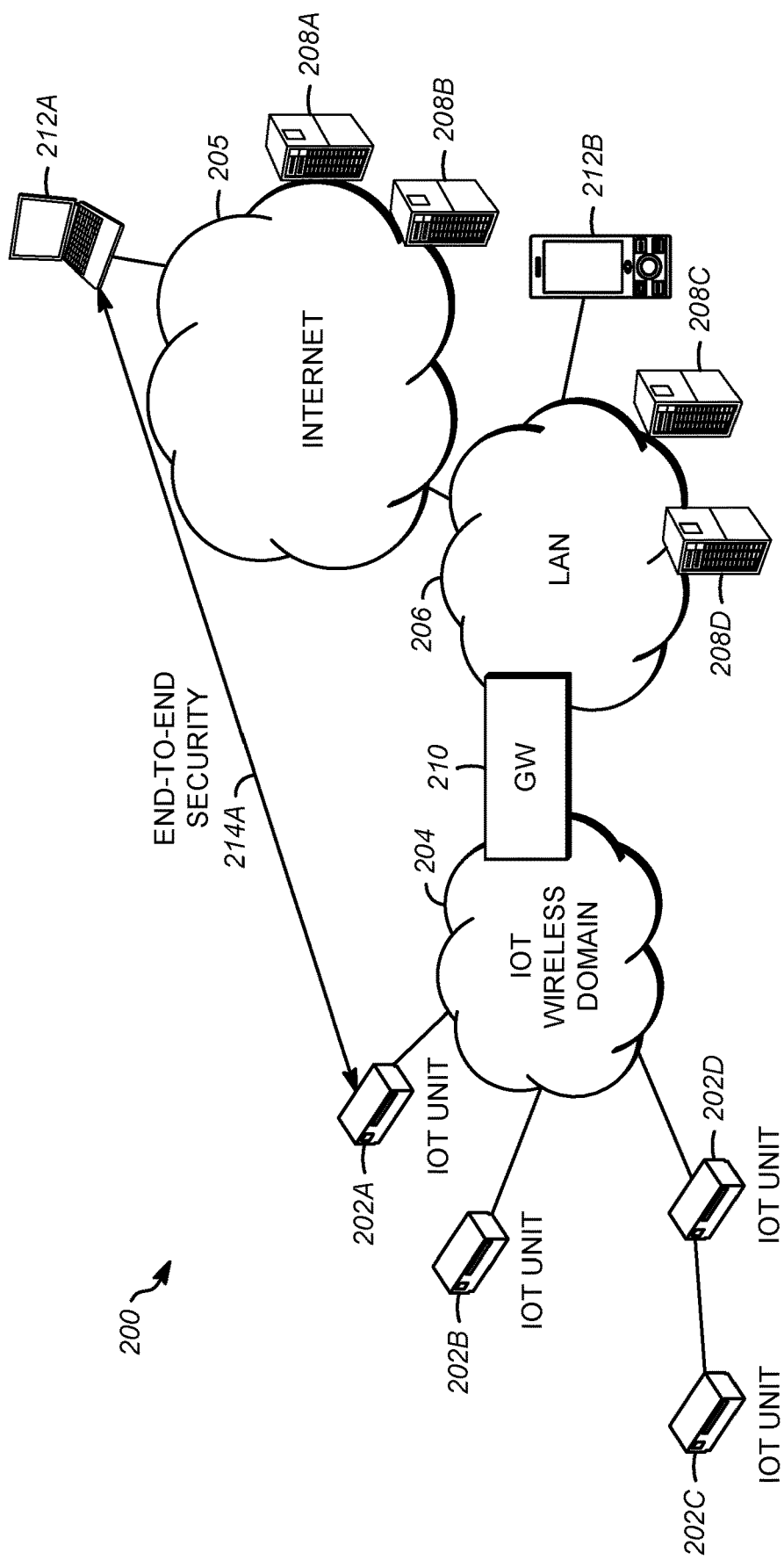
FIG. 1 illustrates an example IoT network.

As described herein, Machine-to-Machine (M2M) or Internet-of-Things (IoT) systems may be deployed. FIG. 1 illustrates an example of a M2M and/or IoT network 200. As shown in FIG. 1, the system or network 200 may include distributed units such as IoT units 202A-D. M2M and/or IoT units may be referred to as IoT units or devices. For example, IoT units or devices may include M2M units or devices, IoT units or device, and/or other similar devices or units. IoT units or devices may include components such as those described with respect to the devices or WTRUs 102a-d in FIGS. 12A-12E. In an example, as shown in FIG. 1, the IoT units 202A-D may be wireless devices, e.g., a set of wireless battery driven devices. The IoT units 202A-D may be communicated and/or controlled (e.g., directly) by a device or a back-end server such as devices 208A-D. For example, devices 208A-D may include any suitable computer, device, server, database, node, server host, and/or the like. The IoT units 202A-D may be communicated and/or controlled (e.g., directly) by a device management server (DMS) and/or by an end-user management clients or devices such as smart phones, computers such as laptop computers or desktops, tablets, and/or the like. For example, end-user management clients or devices 212A and/or 212B may control or communicate with the IoT units 202A-D. The devices 208A-D and/or the end-user management clients or devices 212A and/or 212B may belong to an owner organization. The owner organization may be a gateway (GW) unit 210. The end-user management clients or devices 212A and/or 212B may control the end-user devices or units (e.g., 202A-D) directly or through one or more of the devices 208A-D. For example, when the end-user management clients or devices 212A and/or 212B control the end-user devices or units 202A-D, e.g., through a DMS. The management clients or devices 212A and/or 212B may or may not have (e.g., may not need to have) security associations with each of the IoT units 202A-D. Security associations with some or all of the IoT units 202A-D may be provided and/or handled by one or more of the devices 208A-D on behalf of the management clients or devices 212A and/or 212B.

The IoT units 202A-D may be connected to the GW 210, for example, to provide communication between the devices in the network 200 and/or to enable control by the devices 208A-D and/or the management clients or devices 212A and/or 212B of the IoT units 202A-D. The GW 210 may include a server, computer, database, device, and/or the like. The GW 210 may provide local network connectivity and/or global internet connectivity to the IoT units 202A-D. The IoT units 202A-D may have general Internet connectivity (e.g., to the Internet 205). An access thereto may be provided by the GW 210 and may be of different types including, but not limited to, cellular access, WLAN access, fixed broadband access or corporate network access, and/or the like. For example, as shown in FIG. 1, the IoT units 202A-D may be connected to an IoT wireless domain 204. The IoT wireless domain 204 may be connected to the GW 210. The GW 210 may be connected to LAN 206. Via or through the LAN 206, the GW 210 may be connected to the Internet 205 and may have internet connectivity. The GW 210, for example, via the IoT wireless domain 204 may provide Internet connectivity to the IoT devices 202A-D and/or provide communication to the back-end system such as devices 208A-D, and/or management clients or devices 212A and/or 212B using the LAN 206. One or more of the IoT units 202A-D may be connected to a cellular network. For example, the cellular network may be one or more of the networks described in FIGS. 12A and 12C-E. One or more of the IoT units 202A-D may connect to the internet 205 through the cellular network. One or more of the IoT units 202A-D may be directly connected to the Internet 205.

For example, as shown in FIG. 1, the management client devices 212A and/or 212B and/or the devices 208A-D may be connected to the Internet 205 to control, access, and/or manage the IoT units 202A-D. As shown in FIG. 1, the devices 208A-B and/or the management client or device 212A may be connected to the Internet 205 (e.g., directly) to control, access, and/or manage the IoT units 202A-D. The DMSs 208C-D and/or the management client or device 212B may be connected to the LAN 206. The LAN 206 may provide connectivity to the Internet 205 such that the devices 208C-D and/or the management client or device 212B may control, access and/or manage the IoT units 202A-D.

For example, as shown in FIG. 1, an end-to-end security channel 214A may be established between the management client 212A and an IoT unit such as the IoT unit 202A. An end-to-end security channel 214A may be established between one or more of the devices 208A-D and/or the management client 212B to provide connectivity thereto and/or communication there between.

End-to-end security channels may enable trusted communication and relations between the IoT units 202A-D and the back end system (e.g., the devices 208A-D and/or the management clients or devices 212A and/or 212B), e.g., by enabling them to securely identify each other. The end-to-end security channels (e.g., 214A) may include and/or may be based on Internet Protocol Security (IPsec), Transport Layer Security (TLS), Datagram Transport Layer Security (DTLS), and/or the like. For example, the end-to-end security channels may provide and/or use IoT unit credentials (e.g., unique for each of the IoT unit 202A-D). The IoT unit credentials may be installed on the IoT units or devices 202A-D. The IoT unit credentials may be included or be present on the DMSs 208A-D and/or management clients or devices 212A-B.

A Denial of Service (DoS) attack may occur on one or more of the IoT units (e.g., 202A-D), for example, by one or more of the devices 208A-D and/or one or more of the management clients or devices 212A and/or 212B. For example, an attacker such as a hostile organization or individual may try to destroy a system by launching a DoS attack (e.g., via an attacker such as one or more of the devices 208A-D and/or management clients or devices 212A and/or 212B) on one or more of the IoT units (e.g., 202A-D) in the wireless domain (e.g., 204). According to an example, IoT units or devices may be vulnerable to DoS attacks as they may be or may include resource constrained units and/or may be powered by battery resources. They may be, for example, sensitive to DoS (e.g., a battery exhaustion attack).

Figure 2:
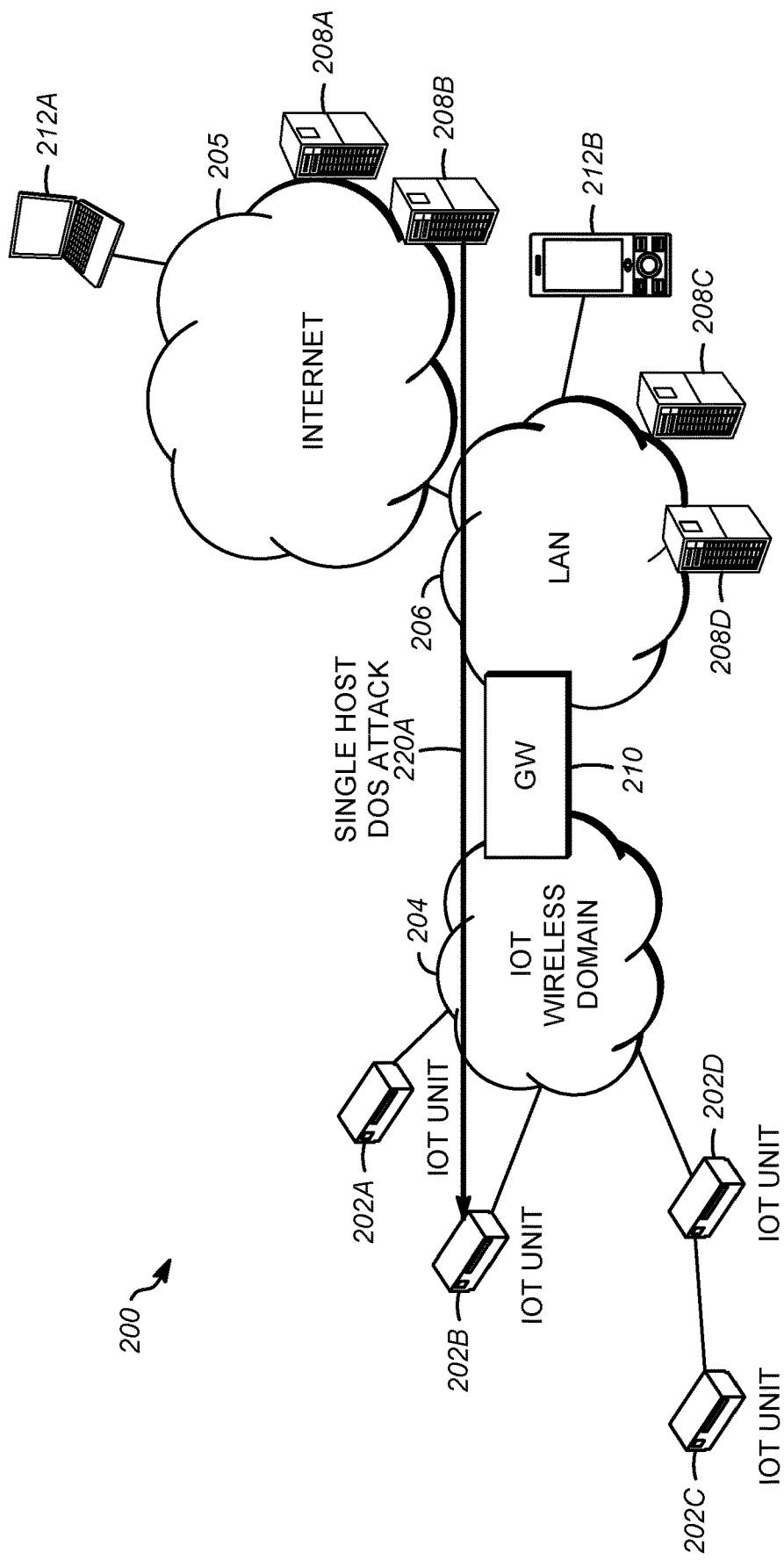
FIG. 2 illustrates an example of a single host DoS attack on an IoT unit/device and/or network in one or more of the examples herein.
Figure 3:
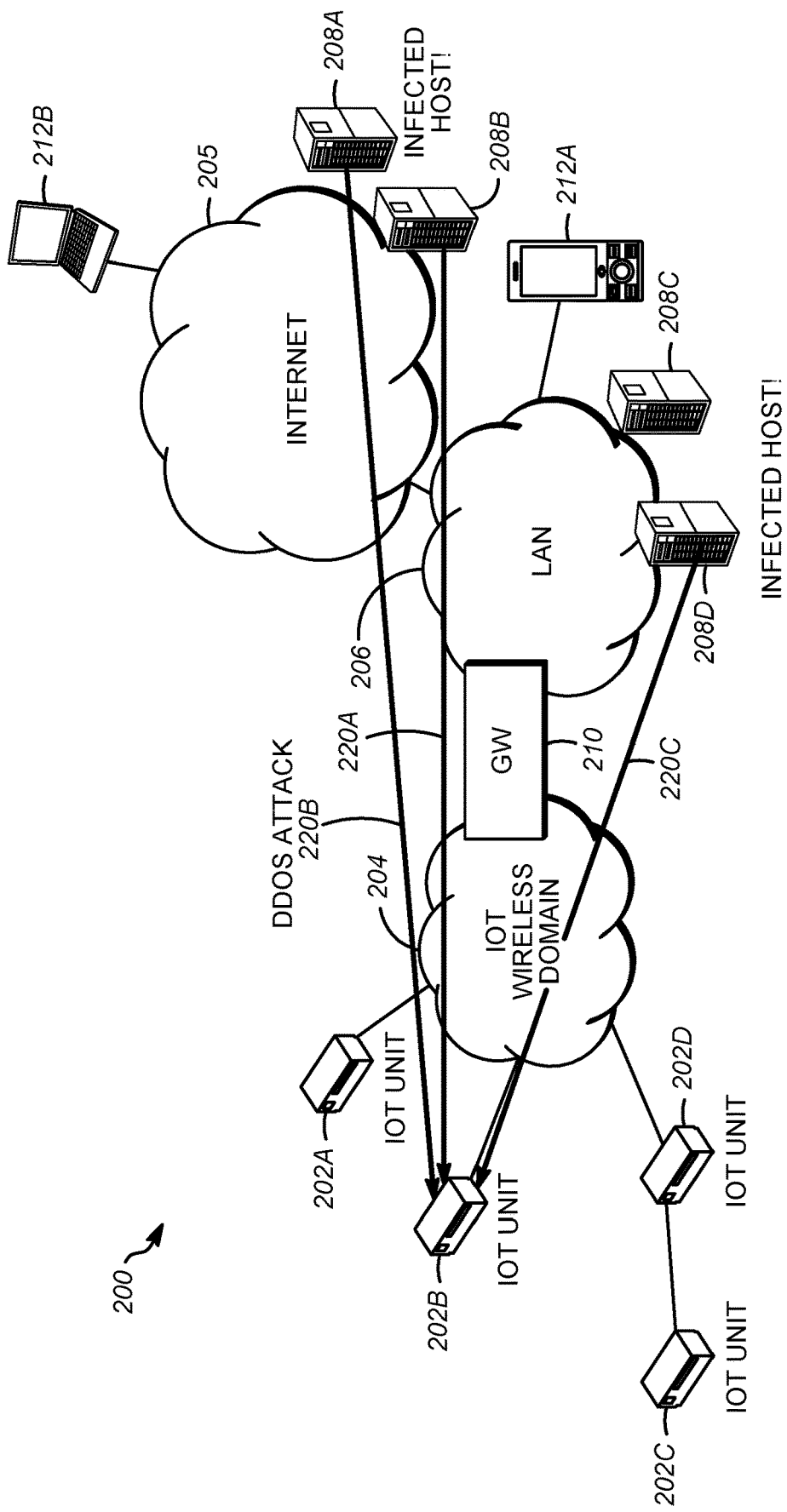
FIG. 3 illustrates an example of a distributed DoS attack on an IoT unit/device and/or network in one or more of the examples herein.

For example, a DoS attack may be performed by launching hostile IP traffic from a single host (e.g., an attacker) as shown in FIG. 2 or by using a Distributed DoS (DDoS) as shown in FIG. 3. For example, as shown in FIG. 2, an attacker such as a hostile organization or an individual may operate a server or device 208B and try to destroy (e.g., via a battery exhaustion attack) the IoT unit 202B by launching a single host DoS attack 220A on the IoT unit 202B. For example, an attacker may use a server or device (e.g., 208A-D and/or 212A, 212B as an attacker) to issue a number, e.g., a large number of dummy requests. For example, the dummy requests may include requests that are made up and/or issued with a purpose of overloading the victim device. The large number of dummy requests towards the IoT units may consume battery power of the IoT units. The IoT units may consume their battery power, e.g., to the point where the battery power is exhausted or nearly exhausted. The dummy requests may or may not be real or valid requests. For example, the dummy requests may be issued for the sole purpose of overloading the victim device. An attacker may use a server or device (e.g., 208A-D and/or 212A, 212B as an attacker) to issue a large number of dummy requests towards the IoT unit(s) such that the IoT units may be incapable of handling legitimate requests. For example, as shown in FIG. 3, one or more infected hosts or devices such as the DMSs or devices 208A, 208D may generate a DoS attack 220B, 220C respectively against the IoT unit 202B. For example, in a DDoS as shown in FIG. 3, the attacker may infect remote machines (e.g., 208A, 208D) by installing attacking source code thereon. In an example, when the attacking source code is executed, the source code may generate DoS traffic or attacks from the remote machines (e.g., 202A, 202D) against a chosen DoS target (e.g., IoT unit 202B).

To defend against DDoS attacks, routers may use filtering and other countermeasures to mitigate the effect of unsophisticated attacks. For example, on a router (e.g., a Cisco router), the filtering and other countermeasures may include one or more of the following: a verify reverse routing path, simple IP address filtering, edge router filtering, committed access rate (CAR), synchronize (SYN) packet rate limiting, and/or the like. In using a verify reverse routing path, the router in the network may be configured to check whether an incoming source IP address has a route in an active routing table (e.g., a current, active routing table). For example, a router may use a lookup table with IP addresses or IP address ranges to determine where to send an incoming packet. If the incoming source IP address does not have a route in an active routing table (e.g., a current, active routing table), a request may be sent to the router requesting that the router drop the packet. In using simple IP address filtering, the router may be configured to allow incoming and/or outcoming IP addresses within specific ranges. In using edge router filtering, routers at the edge of a private network (e.g., an edge router) may apply one or more filtering rule sets configured to restrict traffic to flow over the edge router. For example, the filtering rule sets may be strict such that they may prevent packets (e.g., any packet) with source address outside the address range of the private network from leaving the network. The filtering rule sets may block incoming traffic (e.g., any incoming packet) with source address belonging to the internal network. Committed Access Rate (CAR) may use Internet control message protocol (ICMP) packets (e.g., ping, and/or the like) to flood networks. In an example, a router CAR (e.g., the Cisco CAR) may limit the bandwidth of ICMP packets to mitigate the effect of ICMP based DoS attacks. In using SYN packet rate limiting, a router may be configured to limit the amount of SYN packets and allow a certain amount of SYN packet to flow through. In using SYN packet rate limiting, the router may limit the effect of SYN flooding attacks.

IoT units or devices using cryptographic protocols may be sensitive to DoS attacks. For example, the DoS attacks may try to drain the battery of the devices. A set-up phase of a cryptographic operation may incur significant power consumption cost. To defend against DoS, Datagram Transport Layer Security (DTLS) and/or IPSec Key Exchange (IKE) protocols may use, for example, a cookie technique. For example, the cookie may be a random value (e.g. unique, random value) that is generated by the DTLS and/or the IKE. The DTLS and/or the IKE may force an initiator in a handshake phase to echo a cookie value received in a response. In an example, a node that receives the response (e.g., the device, server, node, and/or the like that may initiate a communication with the IoT unit) may not start the costly handshake operations if a correct cookie value is not received. The cookie technique may protect the IoT units or devices using cryptographic protocols from some DDoS attacks. The cookie technique may or may not prevent advanced attacks where the attacker may receive the cookie and may respond to it, for example. Different approaches may be used to improve DoS robustness for IoT units (e.g., puzzle solving and/or the key based Message Authentication Code (MAC) examples described herein). One or more of the approaches may be based on forcing the attacker to solve a computational demanding puzzle to be able to proceed in the handshake operation. One or more of the approaches may be based on enforcing the initiator to include a short symmetric key based MAC value in a handshake/connection request (e.g., the first handshake/connection request), enabling the IoT units/devices to directly check if a handshake request may be valid or not. The IoT units/devices may directly check if a handshake request is valid or not by calculating and checking a MAC in the header of a user datagram protocol (UDP) message (e.g., the first UDP message sent in the DTLS handshake) and/or in a constrained application protocol (CoAP) connection request message (e.g., the first CoAP connection request message). The IoT units/devices and legitimate initiators may be given a pre-configured trusted relationship such that the legitimate initiators may have access to MAC integrity keys used by the IoT units/devices. The short MAC protected CoAP message format may be shown in FIG. 4, which illustrates an example message format that may be used in one or more examples herein.

FIG. 4 depicts the structure of a CoAP message. A CoAP message, such as CoAP message 400 may include one or more of the following: a protocol version, (Ver) 410, a type field (T) 412, a Token field (TKL) 414, a Code field (Code) 416, A Message ID field (Message ID) 418, Request ID field 420, Validity Check field 422, Options field 424, and Payload filed 426. A byte may contain a protocol version (Ver) 410, a type field (T) 412 with basic message type information, and the size in bytes of a Token field (TKL) 414. A Code field (Code) 416 may contain additional, precise message type information. A Message ID field (Message ID) 418 may include an ID (e.g., a unique ID) used to track messages and detect possible duplications. The Token field 414 may be used to match requests and response messages, and the values of the Token field 414 may be generated for a request (e.g., a random request and/or uniquely for each request). A field may range between 0 and 8 bytes in size (e.g., Octet 1-4, 402-408). The size of the field may aim at making CoAP robust against IP-spoofing attacks. The field may be used in case security is not provided at the transport layer. Several different CoAP options may be defined (e.g., at 424). A list of different CoAP options may be specified according to a Type-Length-Content scheme. The CoAP message content may be included in the Payload field 426. Validity check information may be included at 422.

Techniques or approaches (e.g., as described herein above) for the detection and prevention of DoS and/or DDoS attacks may (e.g., only) make it more difficult to perform massive scale DoS and/or DDoS attacks. Techniques or approaches (e.g., as described herein above) may or may not be able to prevent advance battery drain attacks that may come from an infected node inside an internal network or attacks targeting an IoT unit/device (e.g., a particular IoT unit). The IoT unit/device may be reachable from outside the internal network. Some techniques or approaches may increase the efforts used by an attacker to drain an IoT unit/device. The attacker with enough resources may still be able to initiate an attack and cause damage on the IoT devices and/or units.

Some techniques or approaches may put restrictions on which devices may be able to communicate with an IoT unit/device (e.g., a particular IoT) and enable or allow the IoT unit/device to efficiently detect a DoS attack. An IoT unit/device under attack may use detection techniques or approaches to shut down a radio unit to avoid power costly operations while under attack. Shutting down the IoT device/unit may prevent legitimate clients from connecting to the IoT device/unit.

As such, systems, methods, and/or instrumentalities described herein may be provided that may combine efficient attack detection with an efficient reactive defense strategy. Systems, methods, and/or instrumentalities described herein may enable or allow the IoT device/unit to set-up connection(s) with legitimate external entities and/or may help prevent harmful DoS traffic from reaching the IoT device/unit. For example, the systems, methods and/or instrumentalities may provide an IoT DoS protection where a resource constrained, wireless, IoT unit/device may cooperate with a dedicated GW (e.g., 210) at a border of the IoT wireless domain (e.g., 204) such that the IoT unit/device (e.g., 202A-D) may be protected from an attack, e.g., an attack to drain its battery, and may be able to receive legitimate traffic.

Figure 5A:
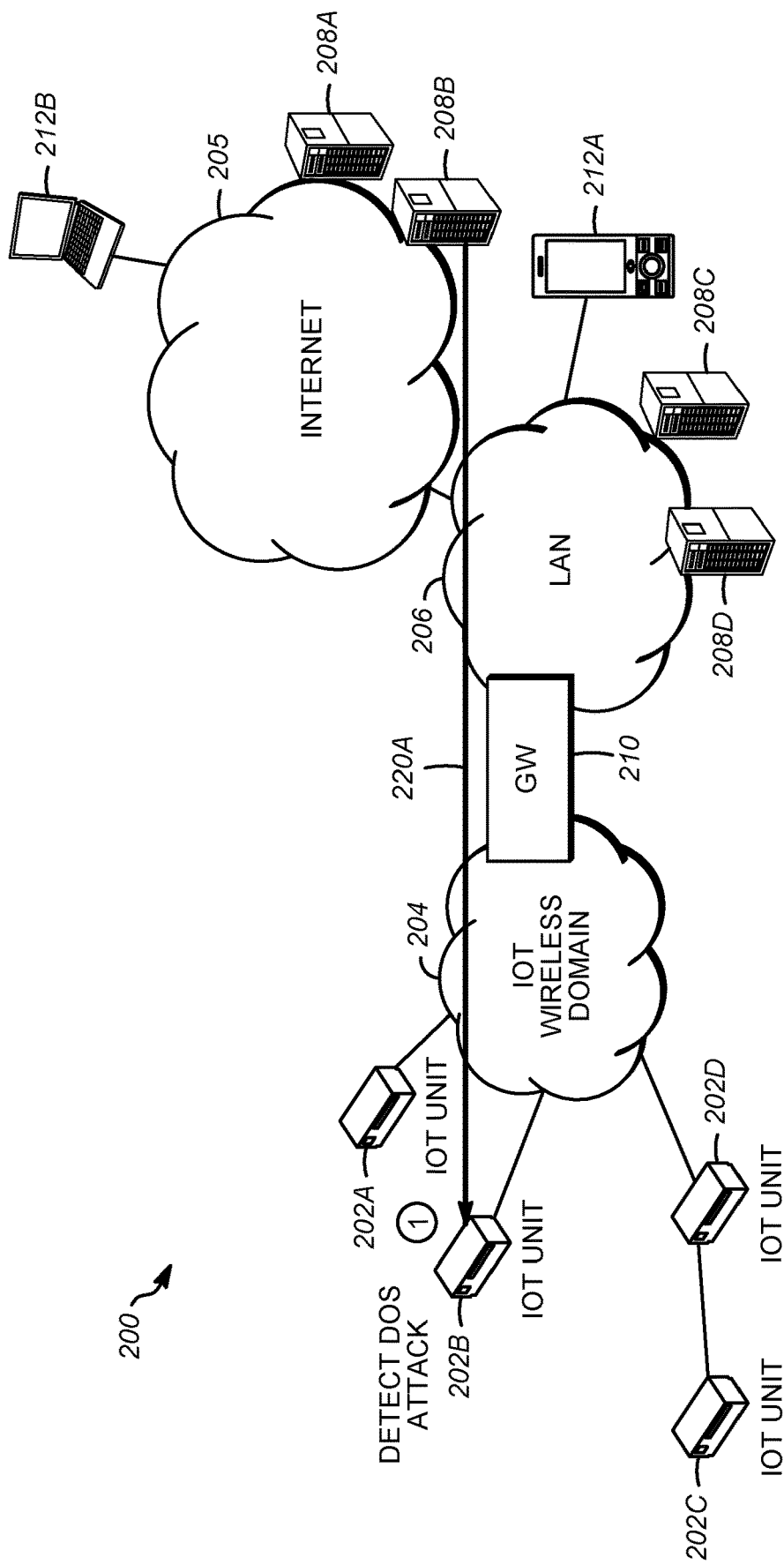
FIGS. 5A-5C illustrate examples of a system and/or a method that may be used in one or more examples herein for providing IoT DoS protection.
Figure 5B:
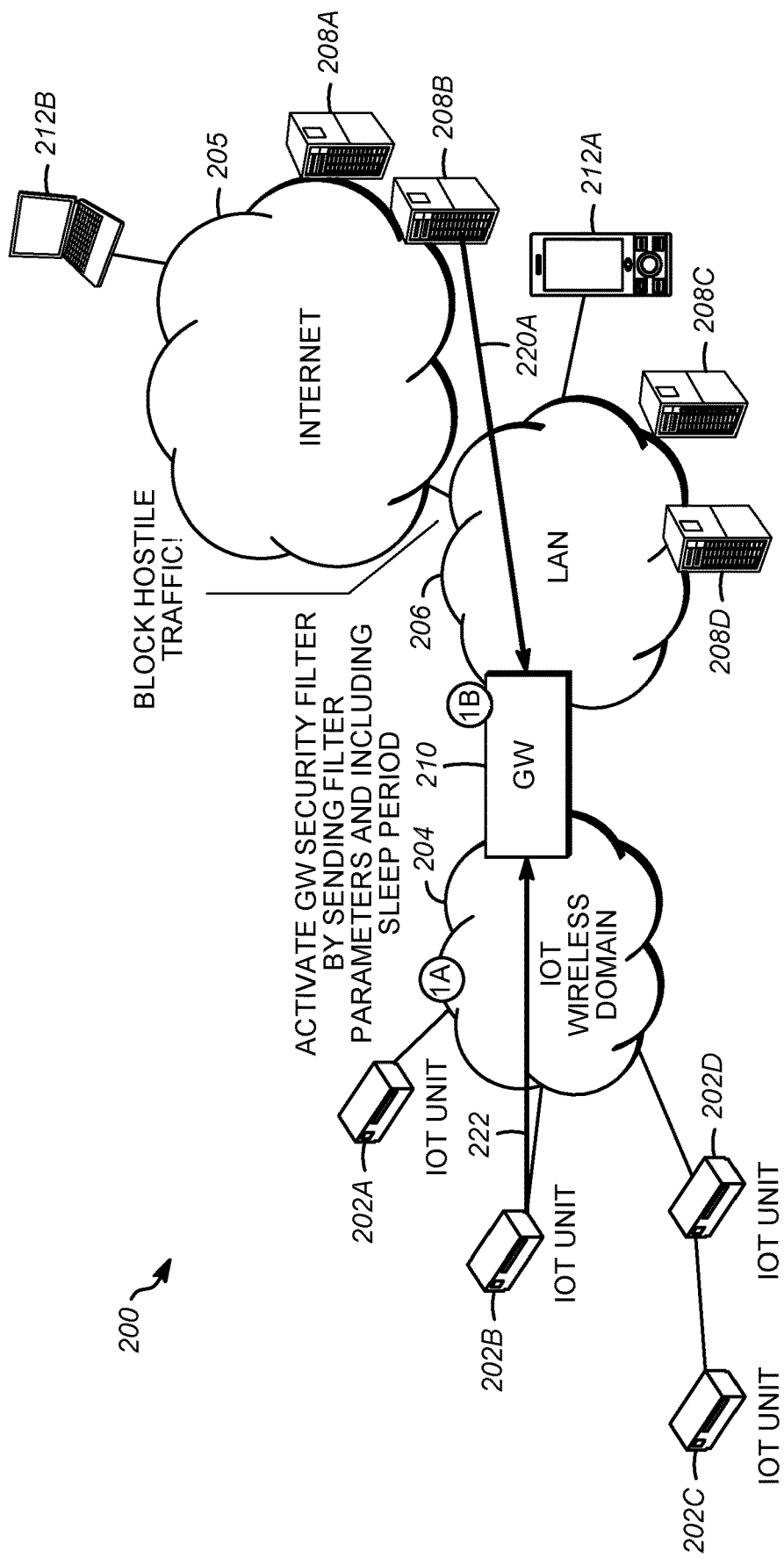
Figure 5C:
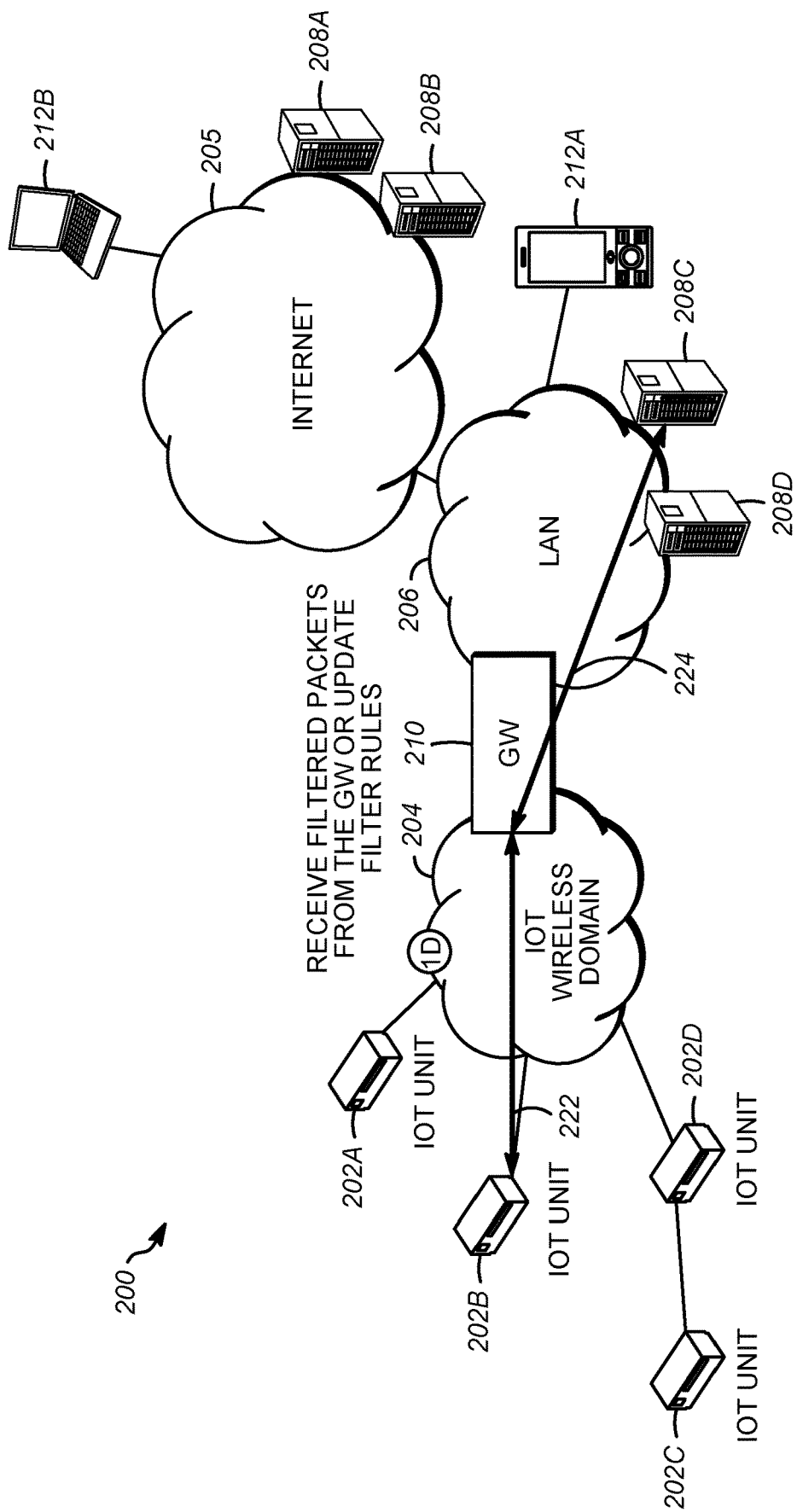

FIGS. 5A-5C illustrate examples of systems, methods, and/or instrumentalities for providing IoT DoS protection using a gateway that may be used in one or more examples herein. For example, the gateway may help prevent a battery drain attack and enable reception of legitimate traffic. As shown in FIG. 5A, at 1, an IoT unit (e.g., 202A-D) may detect an attack (e.g., distinguish between valid and non-valid traffic). A non-valid traffic may include a packet that does not meet a filtering rule set (e.g., a current filtering rule set). For example, an IoT unit may use a cryptographic integrity check, such as short MAC detection, to distinguish between valid and non-valid traffic (e.g., potential hostile DoS traffic such as 220A). When it determines that it is under attack, it may perform and/or apply and/or initiate one or more features shown in FIG. 5B-5C.

As shown in FIG. 5B-5C, at 1a, an IoT unit 202B may connect to the GW 210 and may inform the GW 210 that it is under attack from a server or device, e.g., 208B. The IoT unit 202B may request that the GW 210 to start a security filtering and/or implement filtering rule set(s), e.g., to protect the IoT unit 202B from the hostile traffic (e.g., 220A). These filtering rule sets or approaches may include a range of forbidden IP addresses. The range of forbidden IP addresses may include traffic with addresses that may not be forwarded to the IoT unit 202B. The range may be associated with blocking of traffic except some higher layer protocols such as CoAP, blocking of messages except some with predefined identities and or identity ranges, blocking of protocols except DTLS connections, and/or the like. The IoT unit 202B may send to the GW 210 a sleeping time period (e.g., a period when the IoT unit 202B may not have the radio on for communication). At 1b, the GW 210 may have or possess the information received at 1a to initiate or calculate a different packet filtering rule set, e.g., to protect the IoT unit 202B from hostile traffic. The GW 210 may measure the number of valid packets targeting the IoT unit 202B and may store some or all valid packets for the IoT unit 202B, e.g., in an internal packet queue. For example, some or all valid packets may be dropped if the number of valid packets exceeds a predetermined number. In an example, the IoT unit 202B may go into a sleep mode. The IoT unit 202B may come into an active mode after an agreed sleep time period and receive traffic that is not blocked by the GW 210.

In an example as shown in FIG. 5C, at 1d, the GW 210 may measure a number of valid packets received from a server or device 208C. A valid packet may be a packet that passes according filtering rule sets (e.g., a current filtering rule set). The GW 210 may continue to receive packets during the sleep time period of the IoT unit 202B, and the packets received may be valid packets. The GW 210 may store the valid packets in a packet queue such as an internal packet queue. The GW 210 may forward the valid packets in the packet queue to the IoT unit 202B, e.g., on a condition that the sleep time period may have passed and/or if the number of valid packets in the packet queue does not exceed a threshold (e.g., a pre-defined threshold, for example as described herein). If the number of valid packets may be above a threshold, the GW 210 may update its filtering rule set to a restrictive setting without forwarding the valid packets to the IoT unit 202B. According to examples herein, the GW 210 may continue to measure the number of received valid packets and/or continue to update its filtering rule set. The number of valid packets under an updated filtering rule set may result in still too many valid packets received, for example, the number of valid packets may be over a threshold (e.g., a pre-defined threshold as described herein). The GW 210 may send a general warning to the system responsible that it may be under severe attack against which it has no efficient protection. The system responsible may include an IoT device organization, an IoT device management system, and/or IoT network.

Figure 6:
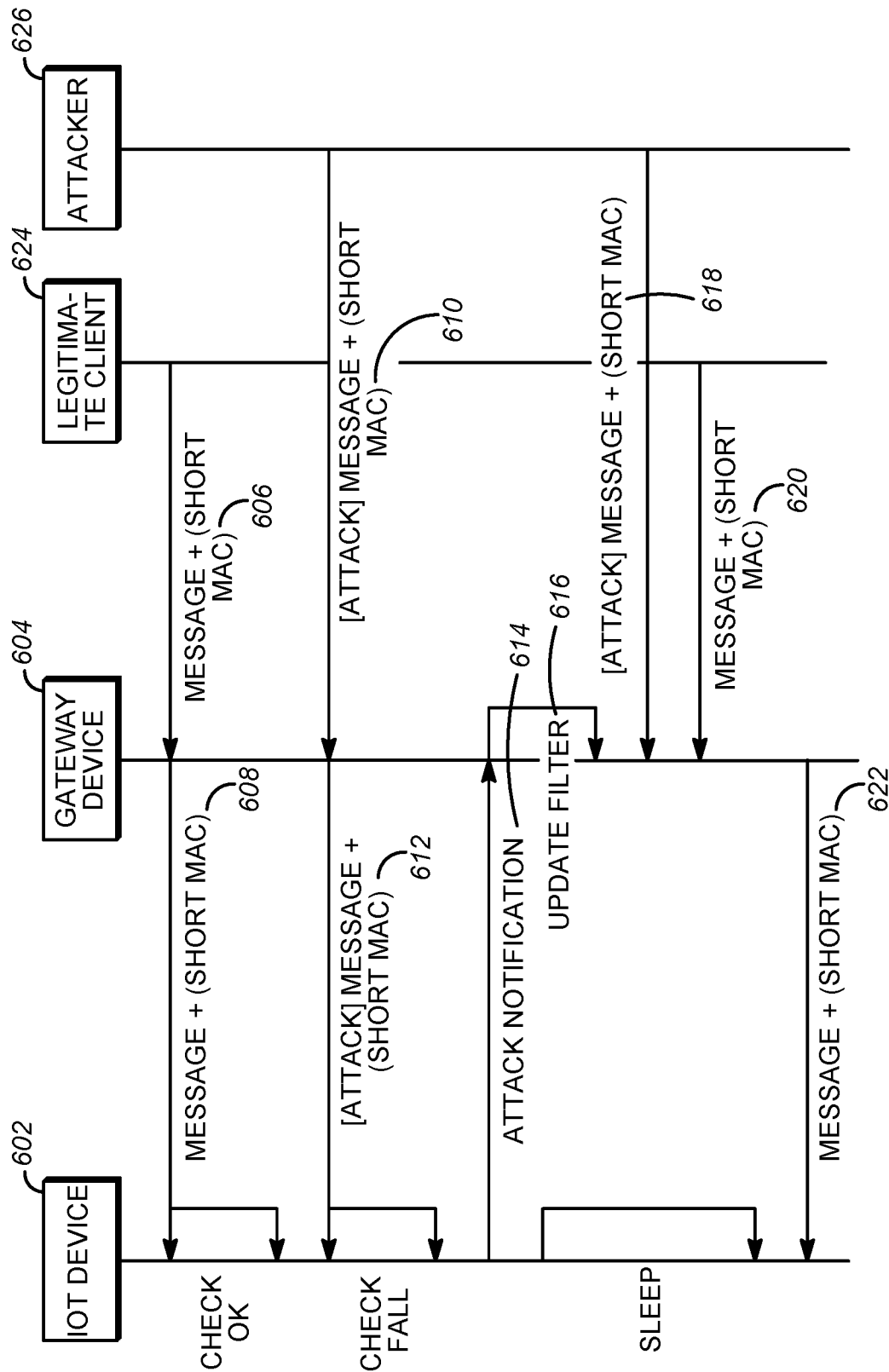
FIG. 6 illustrates an example flow diagram of a method for defending against DoS attacks as described in one or more of the examples herein.

FIG. 6 illustrates an example messaging diagram associated with defending against DoS attacks as described in examples herein. For example, as shown in FIG. 6, a GW 604 may receive a communication 606 directed to an IoT unit/device 602 (e.g., from a legitimate client 624 or attacker 626). The GW 604 may forward the communication 608 to the IoT device 602. The GW 604 may forward a communication 610 that may be received from an attacker 626 to the IoT device 602 at 612. The GW 604 may receive (e.g., from the IoT unit/device 602) at least one of the following: an indication that the communication from the attacker 626 may be part of an attack and/or an indication of a requested change to the filtering. In an example (e.g., responsive to the indication from the IoT device 602 that the communication from the attacker 626 may be part of the attack at 614 and/or the indication of the requested change to the filtering), the GW 604 may update filtering rule sets at 616 to prevent further communications from the attacker 626 to the IoT device 602 and may forward subsequent communications 620 that may pass and/or comply the updated filter rules at 622.

The GW may receive from the IoT unit/device an indication of a sleep time and/or may send or transmit the subsequent communications to the IoT unit/device that may pass the updated filter rules after the indicated sleep time may have elapsed. The subsequent communications may pass the updated filter rule based on a threshold associated with valid and non-valid packets of the subsequent communications according to examples discussed herein. In examples, a communication may be associated with an attack based on a determination using short MAC DoS protection (e.g., 606-12, 618-622). Updating the filtering rule sets may include one or more of the following: updating a range of forbidden IP address(es), blocking traffic to the IoT device (e.g., except traffic with higher layer protocols such as CoAP), blocking messages (e.g., except some with predefined identities and or identity ranges), blocking protocols (e.g., except DTLS connections), and/or the like.

As shown in FIG. 6, the IoT unit/device 602 may receive 612, from the GW 604, and the communication 610 from the attacker 626. The IoT unit/device 602 may determine (e.g., using short MAC DoS protection) that the communication 612 may be part of an attack. The IoT unit/device 602 may send to the GW 604 an indication 614 that the communication from the attacker 626 may be an attack. The filtering rule sets 616 may be updated (e.g., by the GW 604) to prevent further communications such as 618 from the attacker 626 to the IoT unit/device 602, e.g., in response to the indication from the IoT unit 602 that the communication 610 from the attacker 626 may be an attack). The IoT unit/device 602 may send, to the GW 604, an indication of the sleep time (e.g., a time period during which the IoT unit/device 602 will not process communications from the GW 604.

As shown in FIG. 6, communication 620 from a legitimate client 624 may be received and may be forwarded onto the IoT device 602 at 622 (e.g., if the communication 620 passes the filtering rule sets) while the communication 618 from the attacker 626 may be prevented or may not be forwarded as described herein.

The examples described herein (e.g., the systems, methods, and/or instrumentalities as shown and described) may be a complement to the protection of DoS and DDoS attacks based on active or static filtering or DoS detection techniques and/or approaches (e.g., described herein above) in combination with filtering. A higher level of protection of individual and/or sensitive IoT units may be provided. In one example, the examples herein may use the efficient DoS detection systems, methods, and/or instrumentalities described herein e.g., with a collaboration protocol between a IoT unit/device and a GW, which may be at the border of the IoT wireless domain. Through such a collaboration, a computational expansion of filtering at the IoT unit itself may be offloaded to a GW. The GW may be more powerful and/or efficient than the IoT unit/device. The GW may efficiently protect the IoT unit/device (e.g., wireless IoT unit/device) from battery drain attacks and may allow legitimate traffic to reach the IoT unit/device. One or more features described herein may reduce the communication capabilities of the IoT unit/device. Such feature(s) may not stop it (e.g., completely stop it) from performing its potential critical communication task even when it is under a battery drain DoS attack.

In examples (e.g., without loss of generality), the systems, methods, and/or instrumentalities herein may be described and/or used with a system set-up according to short MAC DoS protection and may provide that the IoT units (e.g., 202A-D) may communicate with external peers using Internet Engineering Task Force (IETF) defined protocol such as CoAP. According examples herein, the IoT devices/units may share a long lived master key ($K_M$) with a Key Distribution Centre (KDC) (e.g., 216). The clients that may want to communicate with the IoT unit/device may (e.g., first) contact the KDC to get or receive a session key ($K_S$) and/or other information that may be used to send valid CoAP requests to the IoT unit/device. The IoT unit/device and client may start communicating with the desired IoT unit/device to generate a valid CoAP message header(s), e.g., after or upon receiving KS and a CoAP message ID (IDS). The valid CoAP message header(s) may be accepted by the IoT unit/device without being rejected as DoS attempts, as shown in FIG. 7.

Figure 7:
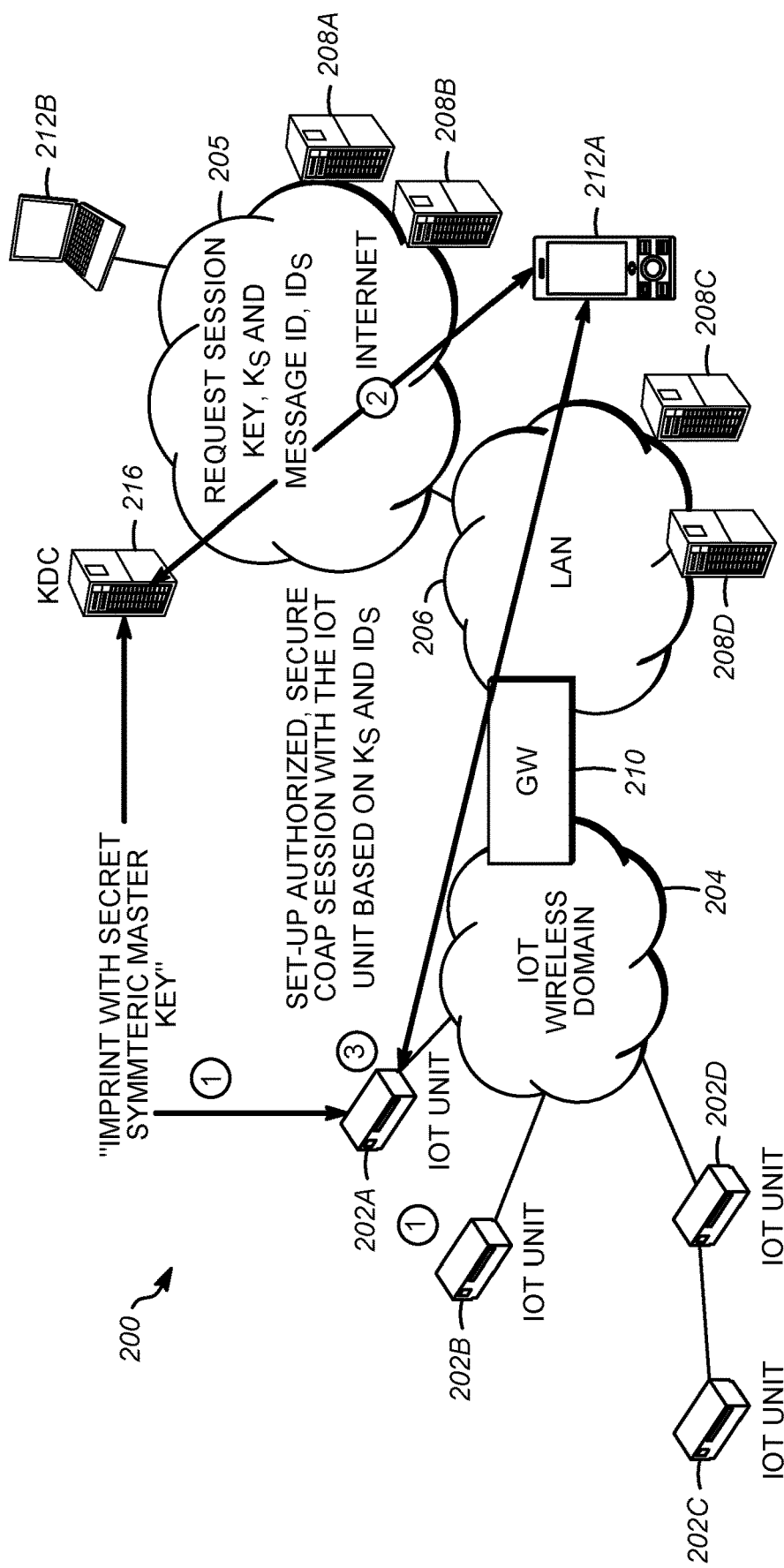
FIG. 7 illustrates an example of a system and/or a method that may be used in one or more examples herein for providing a prerequisite for providing IoT DoS protection.

FIG. 7 illustrates an example of a system and/or method for providing a prerequisite for providing IoT DoS protection that may be used in one or more examples herein. As shown in FIG. 7, at 1, an IoT unit/device (e.g., 202A) may be imprinted with a $K_M$ using the KDC (e.g., 216). At 2, the client (e.g., 212B) that may want to communicate with the IoT unit (e.g., 202A) may contact the KDC (e.g., 216) to receive the key (e.g., a $K_M$) and/or other information that may be used to send requests to the IoT unit (e.g., 202A). As shown, at 3, the IoT unit (e.g., 202A) and the client (e.g., 212A) may start communicating with each other (e.g., via the GW 210 in an example) using a secure channel that may be set up based on the key ($K_M$, $K_S$, $ID_S$, and/or the like).

Figure 8A:
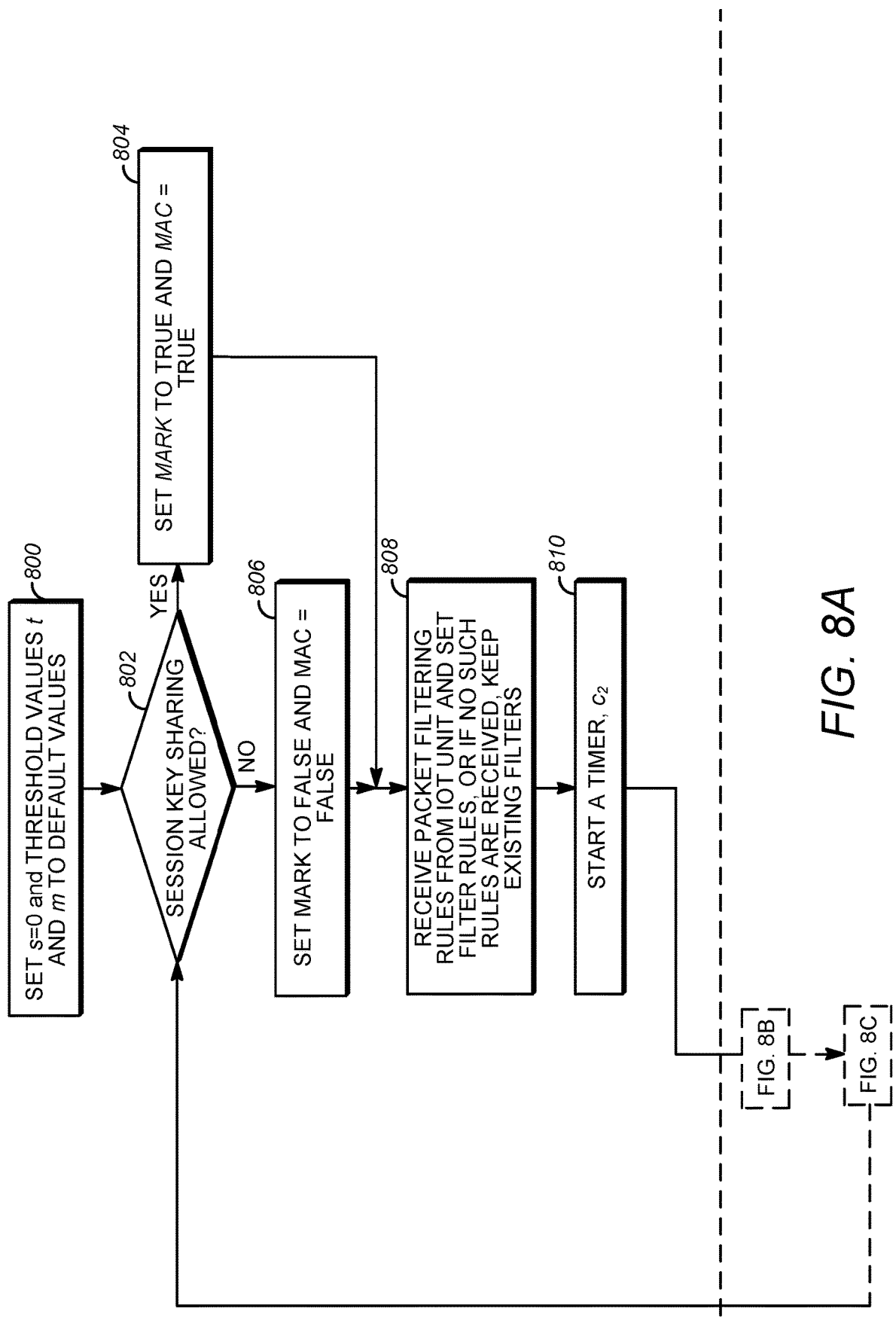
FIGS. 8A-8C illustrate an example diagram of one or more features, e.g., at a gateway, for defending against DoS attacks as described in examples herein.
Figure 8B:
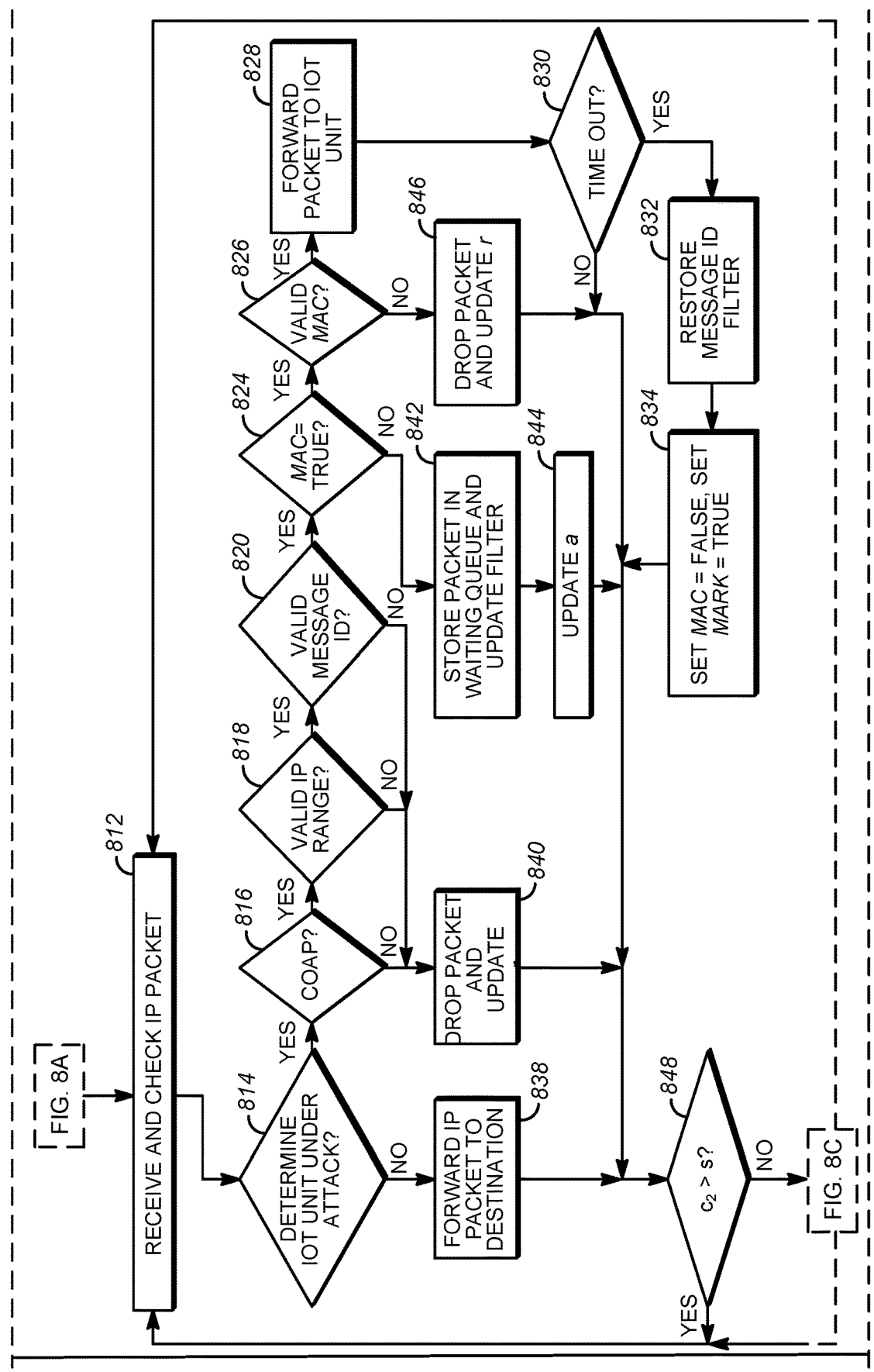
Figure 8C:
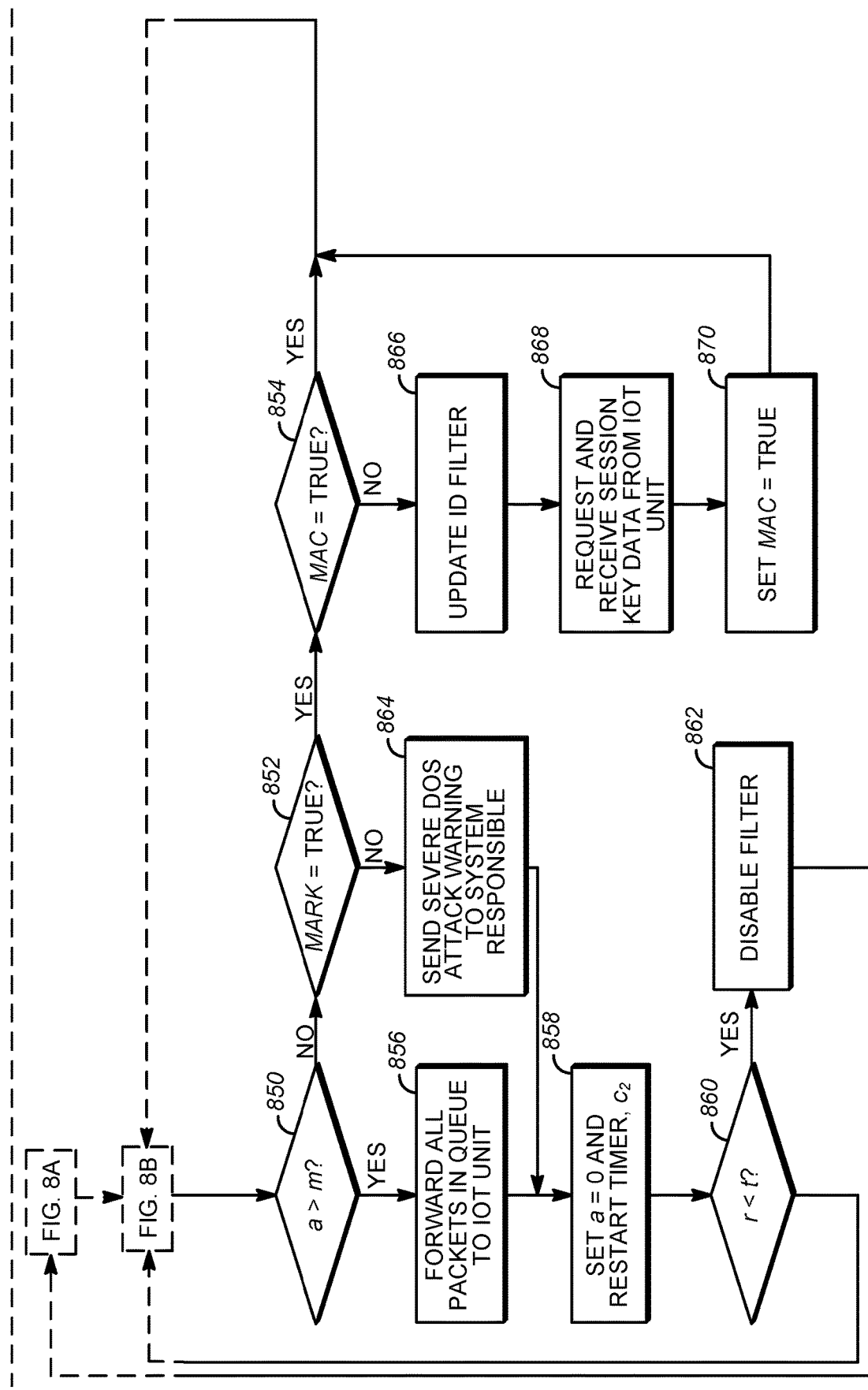
Figure 9A:
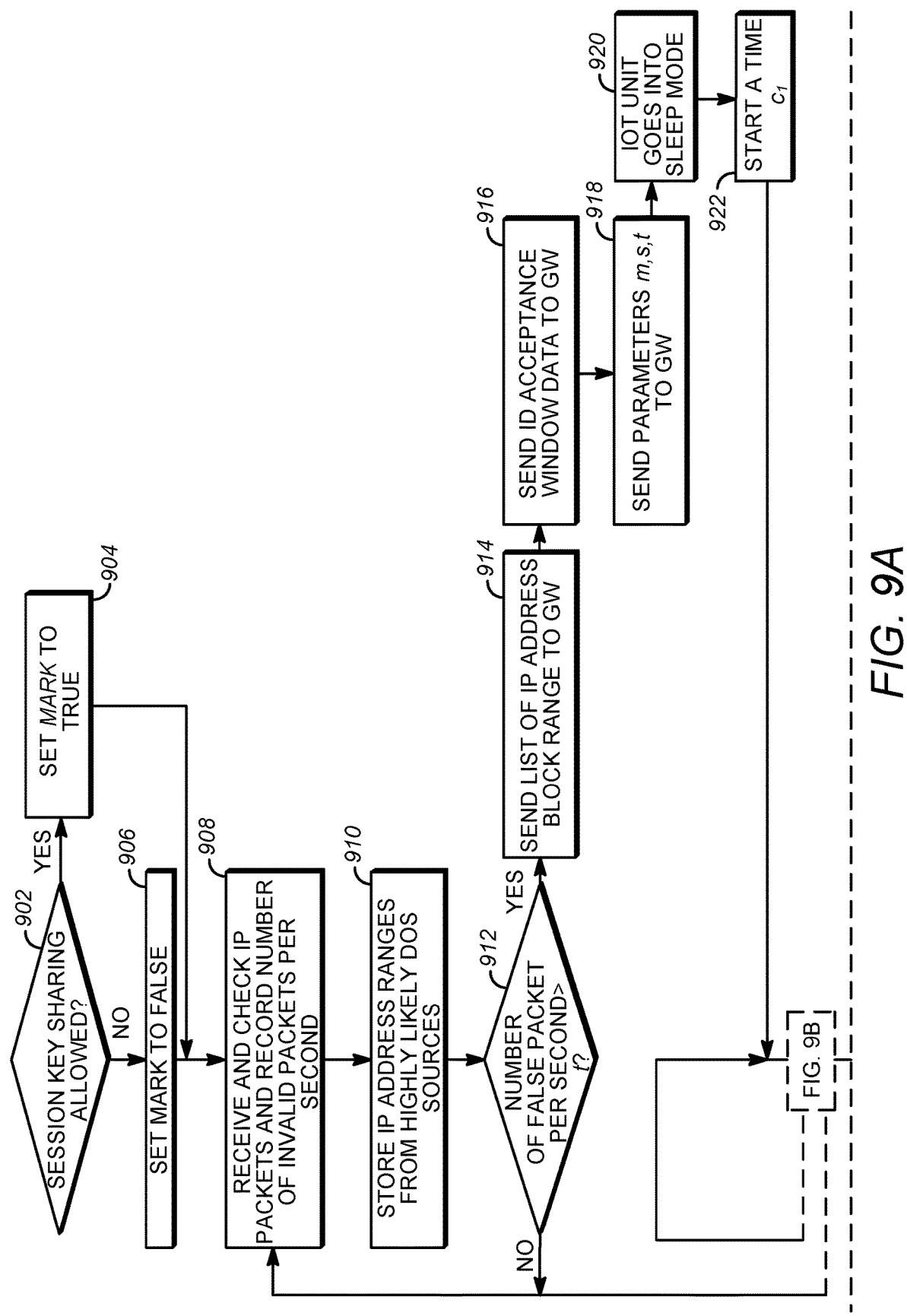
FIGS. 9A-9B illustrate an example diagram of one or more features, e.g., at an IoT device or unit, for defending against DoS attacks as described in examples herein.
Figure 9B:
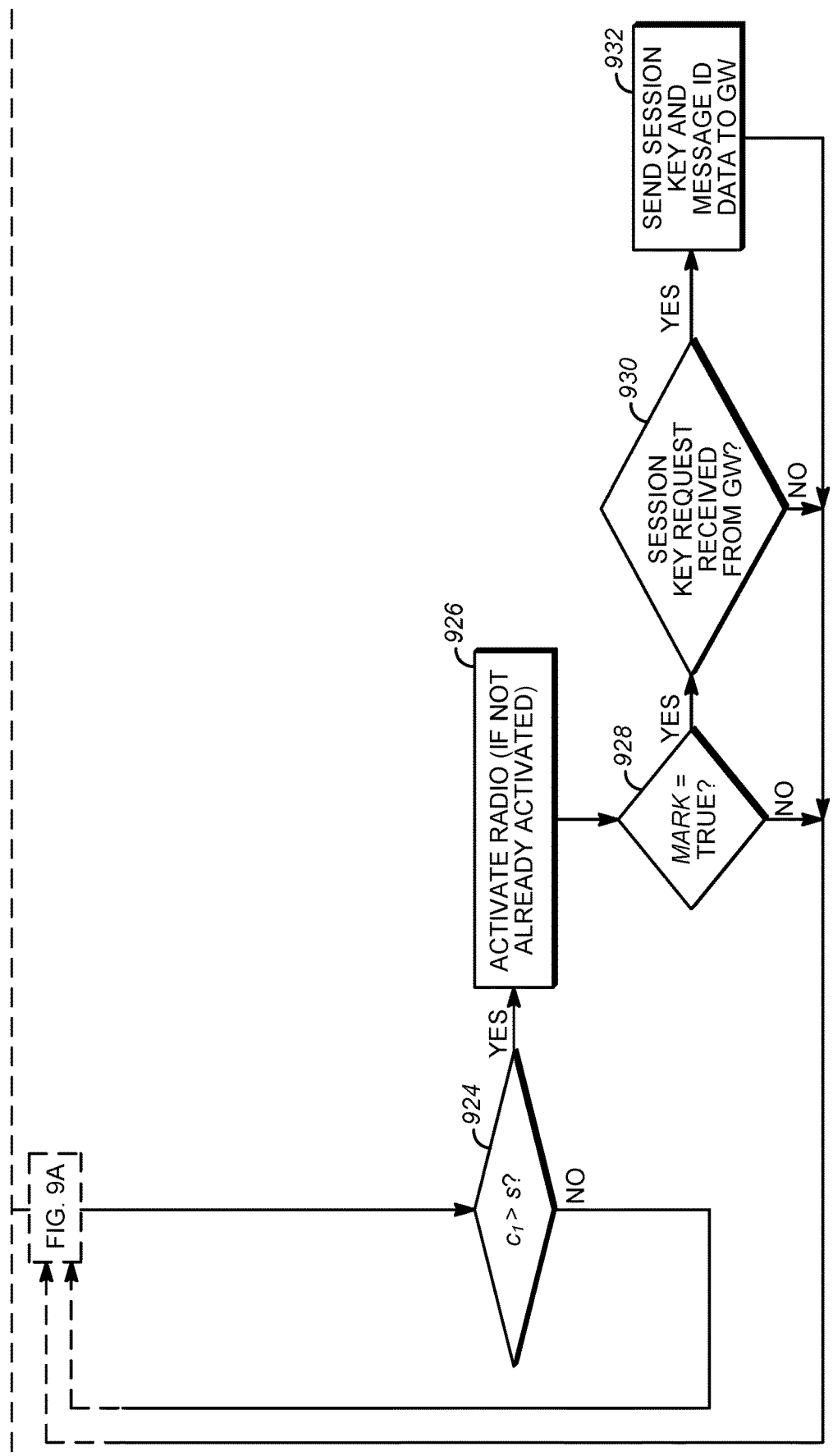

FIGS. 8A-8C illustrates an example diagram of one or more features, e.g., at a gateway, for defending against DoS attacks as described in examples herein. FIGS. 9A-9B illustrate an example diagram of one or more features, e.g., at an IoT device or unit, for defending against DoS attacks as described in examples herein. In such examples, the method may be used, for example, when an IoT unit may be under battery drain DoS attack, and an attacker may send a large number of CoAP request messages to the IoT unit under attack. Such principles or approaches may be used with another application protocol (e.g., in addition to the examples described herein with respect to CoAP).

As shown and described, a GW may initialize parameters at 800. For example, the GW may initialize the values for various threshold parameters including s, m, and/or t. For example, the GW may initialize s to zero or relatively zero. The GW may initialize m and or t to a value of a suitable system constant that is set by an administrator. The GW may determine whether to share session key with a IoT unit at 802. The GW and the IoT unit may set the value mark=false or mac=false at 806, for example, if session key sharing between the GW and the IoT unit is not allowed at 802. The GW and an IoT unit may set the value mark=true and mac=true at 804, for example, if session key sharing between the GW and the IoT unit is allowed at 802. Session key sharing between the GW and the IoT unit may allow the GW to assist the IoT unit to receive a large amount of valid packets (e.g., a larger amount than not using session key sharing). Session key sharing between the GW and the IoT unit may lower general security level due to the fact that the IoT units may share session key values with the GW.

The GW may receive packet filtering rule sets from IoT units/devices (e.g., the DoS information described herein) at 808. The GW may start or update a DoS filter for the protection of the IoT unit according to the packet filtering rule sets. The GW may start and/or initialize an internal clock, c2=0 at 810. The GW may measure a lapse of time since the reception of the packets to be able to determine, for example, when the IoT units may wake up again. The DoS filter may be applied according to a process. For example, in FIG. 8A-8C, the GW may receive packets that may have the destination address of the IoT unit and may check the packets (e.g., the GW may check the packets with respect to their higher level protocol) at 812. The GW may determine whether the IoT unit is under attack at 814. For example, the GW may determine that the IoT unit is under attack based on a message from the IoT unit. If the GW determines that the GW is under an attack at 814, the GW may determine whether the packet is a CoAP packet at 816. If the packet is determined to be a CoAP packet, the GW may determine whether the CoAP packet may be within a valid internet protocol IP range at 818. If the packet is determined not to be a CoAP packet at 816, the packet may be dropped at 840, and the GW may update a filtering set at 840 and decide whether c2 is greater than s at 848. If the packet is determined to be a CoAP packet at 816, the GW may determine whether the CoAP packet is within a valid internet protocol (IP) range. If the CoAP packet is not within a valid internet protocol IP range (e.g., the packet may include a forbidden IP source) at 818, the GW drop the packet, and update the filtering set at 840. If the CoAP packet is determined to be within a valid internet protocol IP range at 818, the GW may determine whether the packet include a valid message ID at 820. If the packet is determined not to include a valid message ID at 820, the GW may drop the packet, and update the filtering set at 840. If the packet is determined to include a valid message ID at 820, the GW may determine whether mac=true at 824. An ID may be the message ID of a received CoAP IP packet targeting the IoT unit. If mac is determined to be true at 824, the GW may determine whether the packet includes a valid mac at 826. If mac is determined to be false at 824, the GW may store the packet in a waiting queue buffer at 842. The packet filtering rule set may be updated according to a suitable acceptance window algorithm or method at 842. At 844 the GW may update the parameter, a (e.g., the number of accepted packets per second), and the GW may decide whether c2 is greater than s at 848.

In an example (e.g., if ID ε $\overline{ID}_p$), the packet may be accepted as a packet from an valid ongoing CoAP session and it may be stored in a waiting queue buffer. The set $\overline{ID}_p$ may be updated according to a suitable acceptance window algorithm or method. Such a window algorithm or method may include, for example, a sliding window method that may be applied where the last received packet ID may be removed from the set $\overline{ID}_p$ and a different ID may be added to the $\overline{ID}_p$ set. The different ID may, for example, be the current "end mark" ID of the sliding window plus a given constant value modulus the maximum ID value in the set $\overline{ID}_p$.

If the packet is determined to include a valid mac at 826, the GW may forward the packet to the IoT unit at 828. For example, if ID ε $\overline{ID}_q$, the packet may be accepted as a packet from a new CoAP session and it may be stored in a waiting queue buffer and the set $\overline{ID}_q$ may be updated according to the suitable acceptance window algorithm. If the packet is determined not to include a valid mac at 826, the GW may drop the packet and update the parameter, r, which may determine the number of received false packets per second towards the IoT unit at 846, and the GW may decide whether c2 is greater than s at 848.

The GW may face timeout while forwarding the packet to the IoT. If the GW determines, at 830, that, after a suitable, predefined time period, the GW does not receive a valid packet from on-going valid sessions and/or forward the packet to the IoT, the GW may restore the message ID filter at 832. The GW may set mark=true and/or set mac=false at 834. The GW may decide whether c2 is greater than s at 848.

For example, the GW may set $ID_p = \Phi$, restore a old value for $\overline{ID}_q$ using the parameters received from the IoT, and set mark=true. If the GW determines, at 830, that, after a suitable, predefined time period, the GW receives a valid packet from on-going valid sessions and/or forwards the packet to the IoT, the GW may decide whether c2 is greater than s at 848.

If the GW determines that the GW is not under an attack at 814, the GW may forward the IP packet to a destination at 838. The GW may determine whether c2 is greater than s at 848. If c2 is determined to be greater than s at 848, the GW may receive packets that may have the destination address of the IoT unit and may check the packets (e.g., the GW may check the packets with respect to their higher level protocol) at 812 and go through the process as described herein. If c2 is determined not to be greater than s at 848, the GW may determine whether a is less than m at 850. The GW may measure the number of accepted packets per second, a, that may be targeting the IoT device. m may be a maximum number of allowed IP packets per second.

If a is determined not to be less than m at 850, the GW may determine whether mark=true at 852. If mark is determined not be true at 852, the GW may send severe DoS attack warning to the system responsible at 864. The GW may initialize a and restart timer c2 at 858. If a determination is made that mark=true at 852, the GW may determine whether mac is true at 854. If the mac is determined to be true at 854, the GW may receive packets that may have the destination address of the IoT unit and may check the packets (e.g., the GW may check the packets with respect to their higher level protocol) at 812 and go through the process as described herein. If the mac is determined not to be true at 854, the GW may update ID filter at 866. The GW may request and receive session key data from the IoT unit at 868. The GW may set mac=true at 870. The GW may receive packets that may have the destination address of the IoT unit and may check the packets (e.g., the GW may check the packets with respect to their higher level protocol) at 812 and go through the process as described herein. The GW may measure the number of accepted packets per second, a, that may be targeting the IoT device. If a is determined to be less than m at 850, the GW may forward some or all packets in queue to the IoT unit at 856. The GW may initialize a and restart timer c2 at 858.

The GW may measure the number of dropped packets per second targeting the IoT device, which may be denoted by r packets/second. The GW may compare the number of dropped packets per second targeting the IoT device against a threshold value t. The GW may determine whether r is less than t at 860. If r is determined to be less than t at 860, the GW may disable timer at 862. The GW may determine whether to share session key with the IoT unit at 802 and go through the process as described herein. If r is determined not to be less than t at 860, the GW may receive packets that may have the destination address of the IoT unit and may check the packets (e.g., the GW may check the packets with respect to their higher level protocol) at 812 and go through the process as described herein.

According to an example, the GW may determine or check if c2>s and if a<m, and if so, it may start forwarding sequentially queued packets targeting the IoT until the packet queue may be empty and it may set a=0 and c2 may reinitialized to 0. Otherwise, if c2>s and a>=m, the following may be performed or applied. The GW may determine or assume a more severe attack and if mark=true, it may send a warning to the system responsible that it may be attack and the GW may set a=0 and c2 may be reinitialized to 0 and may proceed as described herein. According to an example (e.g., if mark=false where GW may be able to check and forward packets to the IoT unit for ongoing sessions and may allow or enable the IoT to complete the ongoing sessions), the GW may $\overline{ID_q}=\Phi$ and may contact the IoT unit and ask for the session keys for ongoing sessions. In such an example, the IoT unit may send as response to the request a list of ongoing active session keys, $\overline{K_S}=\{K_{S0}, K_{S1}, \ldots, K_{Sv}\}$ and corresponding acceptance message ID set, $\overline{ID_p}=\{ID_{S0}, ID_{S2}, \ldots, ID_{Sn}\}$. The GW may use the parameters received to check the messages it receives for the IoT unit. The GW may be able to validate and/or check an integrity check value, for messages coming from valid CoAP sessions with the IoT unit, and valid messages may be forwarded to the IoT unit while other packets may be blocked. According to an example (e.g., after a suitable, predefined time period without receiving any more valid packets from an ongoing valid session), the GW may set, $\overline{ID_p}=\Phi$ and may restore the original value for $\overline{ID_q}$ using the parameters and may set mark=true. The GW may determine or check whether r may below the threshold value t. In an example (e.g., if the value may below the threshold), the packet filter towards the IoT unit may be disabled and the method may proceed as described herein. If the value may be above the threshold, the method may proceed as described herein.

FIGS. 9A-9B illustrate an example diagram of one or more features, e.g., at an IoT device or unit, for defending against DoS attacks as described in examples herein. The IoT unit may determine whether sharing session key is allowed at 902. If sharing the session key is allowed at 902, the IoT may set mark to true. If sharing the session key is not allowed at 902, the IoT may set mark to false at 906. The IoT device may receive and check IP packets and record a number of invalid packets per second at 908. The IoT unit may store IP address ranges from likely, e.g., highly likely, DoS sources at 910. For example, the IoT unit may receive CoAP request messages from different servers (e.g., 202A-D) on the Internet and may determine or check the validity using the received message ID in the CoAP message header of the messages. If the received message ID is determined to be valid, it may be used together with $K_M$ to calculate a potential session key, $K_S$, according to examples such as a DTLS pre-shared secret or a symmetric key. For example, the received message ID may be used to calculate short MAC checks in the CoAP header. For example, the session key $K_S$ may be used to check the validity of the current and subsequent sequence of messages within a same CoAP session. The IoT unit may be under DoS attack. For example, a large number of CoAP request messages may not be valid. The IoT unit may store IP address ranges from likely DoS sources at 910. For example, for a (e.g., each) non-valid CoAP request, the IoT unit may record and/or store the source IP address of the non-valid packet. The IoT unit may determine whether the number of false packets per second is greater than a threshold at 912. If the number of received false-packets per second may exceed a predefined threshold, e.g., t packets/second, the IoT unit may contact the GW and send a request to start a DoS filtering protection. For example, if the number of false packets per second is greater than a threshold, the IoT unit may send a list of IP address ranges to GW such that the GW may block the packets with the IP addresses in the list at 914. If the number of false packets per second is not greater than a threshold, the IoT unit may receive and check IP packets and record the number of invalid packets per second at 908 and go through the process described herein.

The IoT unit may send ID acceptance window data to the GW at 916. The IoT unit may send one or more parameters to the GW (e.g., m, s, t). The one or more parameters may be included in a request to change a filtering rule set. For example, the request that the IoT unit sends to the GW may include one or more of the following information: a list of recorded source IP addresses or a range of IP addresses that the IoT units may want to be blocked; a maximum number of allowed IP packets per second, m; a set of parameters, P, that may define a set of message ID values and/or message sequence numbers that may be accepted by the IoT unit as valid CoAP message IDs. The set of message ID values may include a set defined by an acceptance window parameter. The parameters may be divided into a first set that may determine the values that may be accepted as an ongoing CoAP session and that may be denoted by $\overline{ID_p}=\{ID_{p0}, ID_{p1}, \ldots, ID_{pn}\}$. A second set may denote the set of acceptable indices for different CoAP sessions that may be denoted by $\overline{ID_q}=\{ID_{q0}, ID_{q1}, \ldots, ID_{qr}\}$; a sleep time period, s, (e.g., a value that may determine the number of micro seconds that the CoAP device may be in sleep mode before it wakes up and may be capable of receiving packets (e.g., over the wireless interface); a threshold value, t; and/or the like.

The IoT unit may go into a sleep mode at 920. The IoT unit may start a timer c1 at 922. The IoT may use an internal clock to determine whether the clock exceeds a sleep time period at 924. For example, the IoT unit may determine whether c1 is greater than s at 924. The IoT unit may continue to determine whether c1 is greater than s at 924 if the IoT unit enters a sleep mode at 920 and start the time c1 at 922. The IoT unit may continue to determine whether c1 is greater than s at 924 if c1 is not greater than s. For example, the IoT unit may start and/or initialize an internal clock, c1=0, and may go into sleep mode. The GW may receive the DoS information described herein from the IoT unit and may start a DoS filter for the protection of the IoT unit. The GW may start and/or initialize an internal clock, c2=0, measuring the time since the reception of the packets to be able to determine, for example, when the IoT unit may wake up again. When the IoT unit wakes up, the IoT unit may activate radio, if the radio is not already activated at 926. For example, when c1>s, the IoT unit may activate its radio and may be capable of receiving traffic from the GW. The IoT unit may determine whether mark=true at 928. If the IoT determines mark=true at 928, the IoT unit may determine whether a session key request is received from the GW at 930. If the IoT determines mark is not true at 928, the IoT unit may receive and check IP packets and record the number of invalid packets per second at 908 and go through the process described herein. If the IoT unit determines that a session key request is received from the GW at 930, the IoT unit may send session key and message ID data to the GW at 932. The IoT unit may receive and check IP packets and record the number of invalid packets per second at 908 and go through the process described herein. If the IoT unit determines that a session key request is not received from the GW at 930, the IoT unit may receive and check IP packets and record the number of invalid packets per second at 908 and go through the process described herein.

In an example, DTLS protection may be provided and/or used. The IoT unit may or may not detect a false IP request using a CoAP header MAC, but may use a MAC in the DTLS header. A session key may or may not be shared between the IoT unit and the GW. Sharing a session key may break the end-to-end DTLS security. DTLS sequence numbers may be used instead of message ID values for filtering. DTLS sequence numbers may provide one or more changes to the DTLS record layer sequence number handling. For example, the changes may include a modification such that not every DTLS layer sequence number may be accepted as a valid sequence number. The sequence number may belong to a predefined acceptance set (e.g., $\overline{ID_p}$ and/or $\overline{ID_q}$). Some minor modifications to the standard processing may be made.

Figure 10:
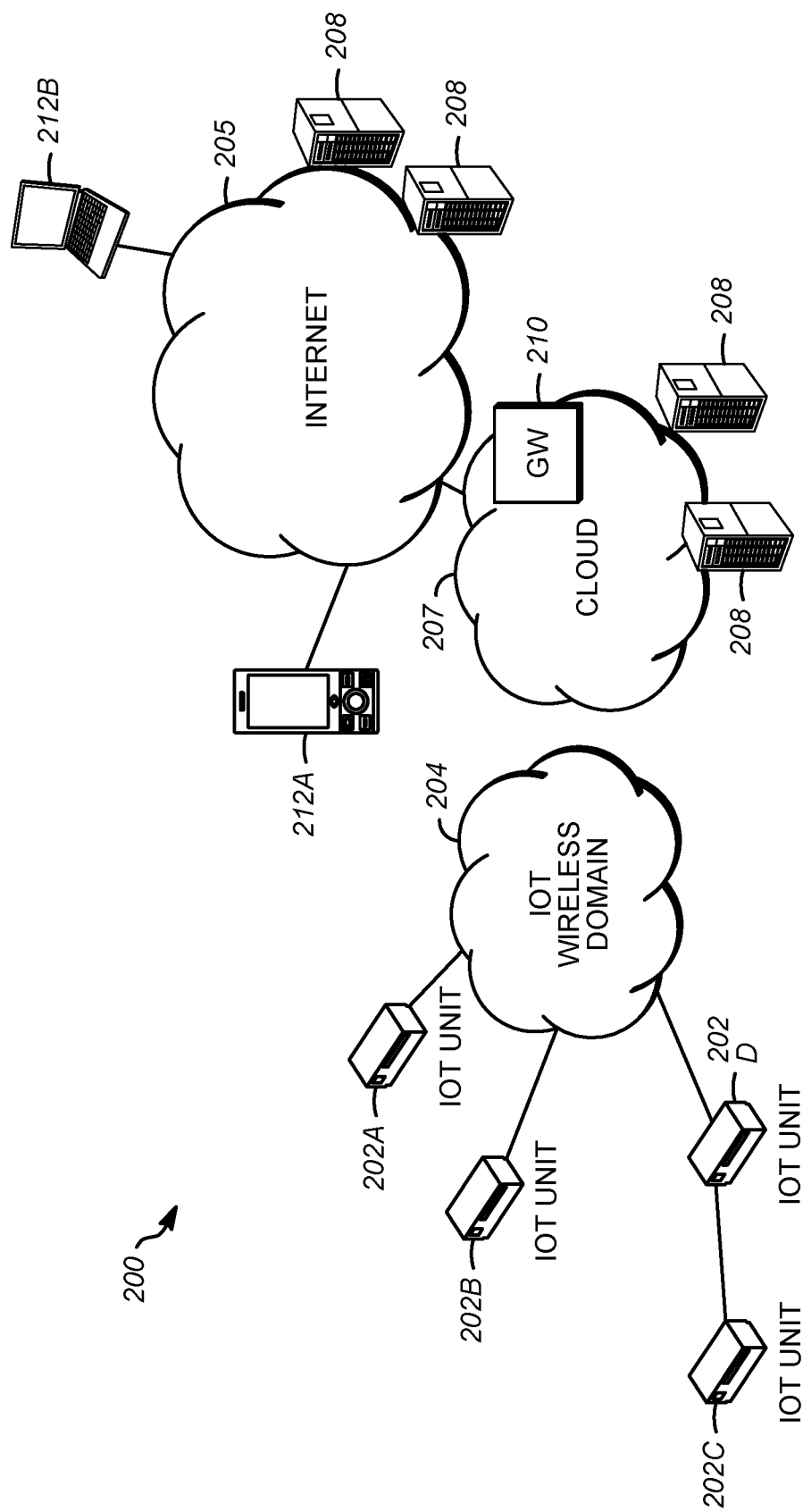
FIG. 10 illustrates an example of a system and/or method that may be used in one or more examples herein for providing filtering and/or IoT DoS protection via a cloud.

A filtering unit in a provider network such as the cloud may be provided and/or used. A filtering function may or may not be performed in a GW at the border of the IoT wireless domain. A DoS filtering method or technique in the provider network (e.g., the cloud) may be able to filter a communication routed towards the wireless IoT domain. FIG. 10 illustrates an example of a system and/or method for providing filtering and/or IoT DoS protection via a cloud. The method or technique shown in FIG. 10 may be used in one or more examples herein. As shown, a cloud 207 may include the functionality of the GW (e.g., 210) described herein for filtering and/or handling an attack while enabling valid communications.

One or more examples herein may be used and/or provided in various use cases. For example, a user may purchase a surveillance security service from a security company. A system including the surveillance security service and the security company may be provided and/or used to implement one or more of the examples herein.

Figure 11A:
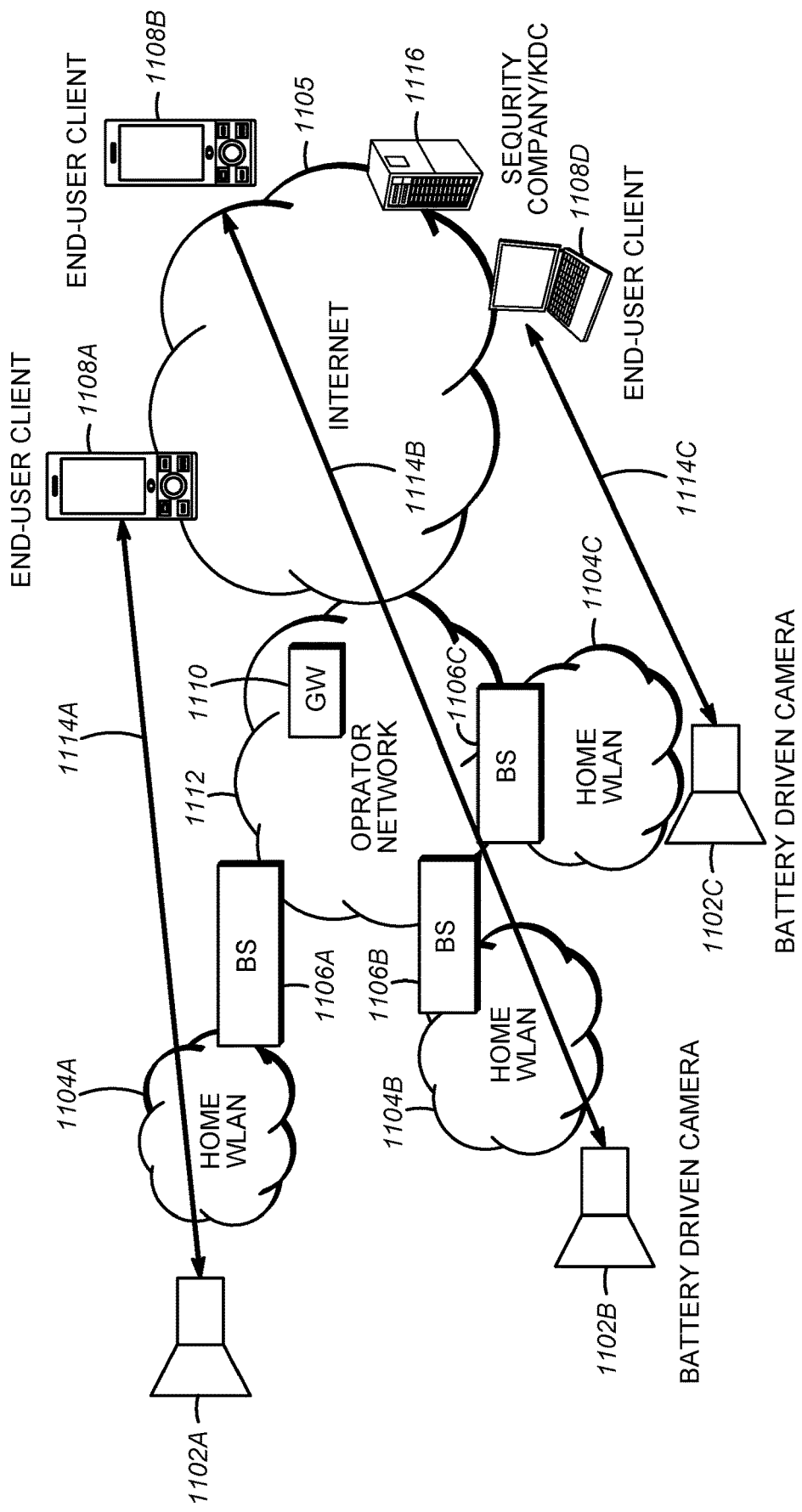
FIGS. 11A-11B illustrate examples of a system and/or a method in which one or more examples described herein may be used and/or implemented.
Figure 11B:
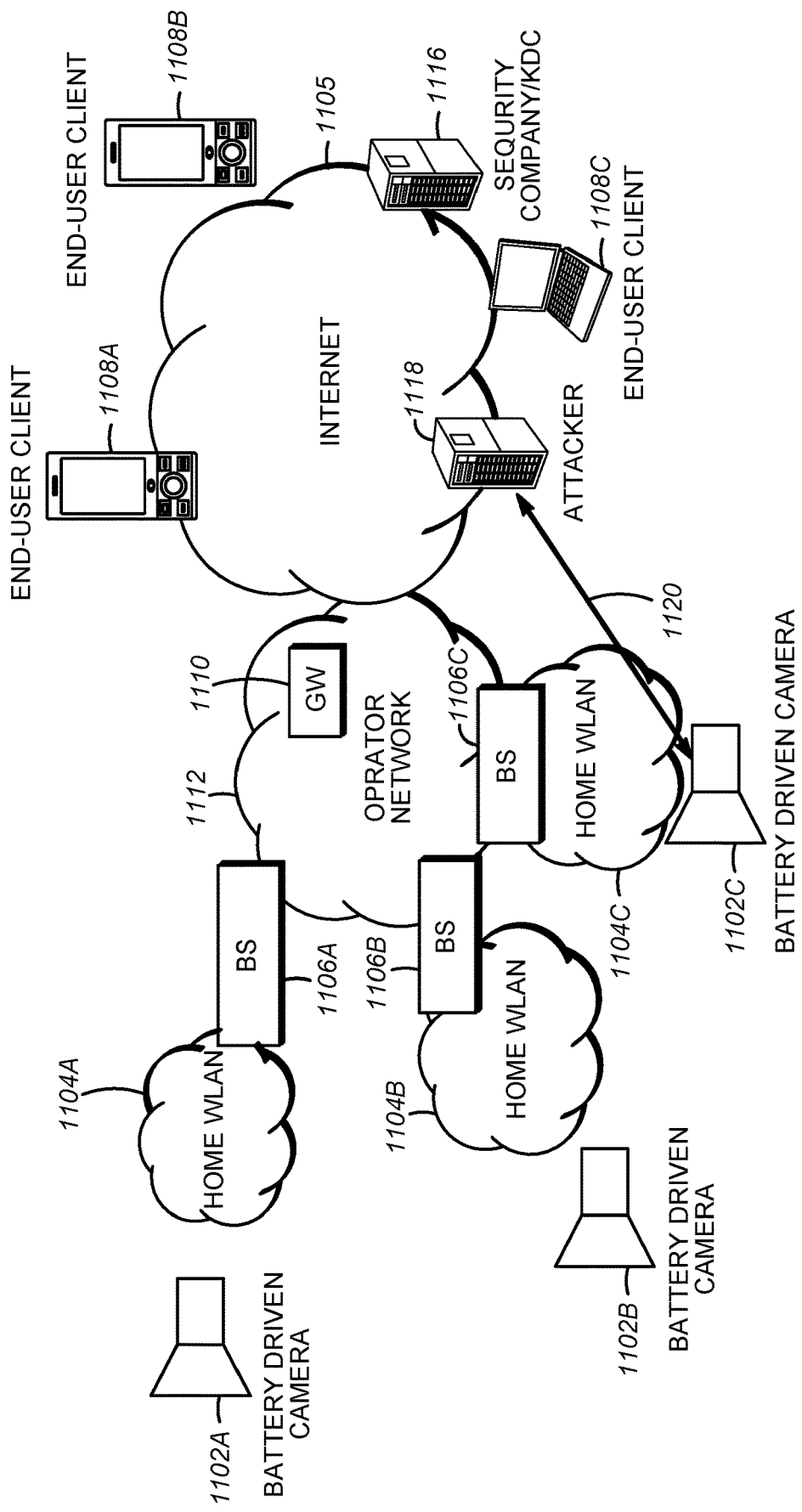

FIGS. 11A-11B illustrate an example of a system (e.g., the real-world scenario described herein) in which one or more examples described herein may be used and/or implemented. As shown in FIG. 11A, an end-user client 1108B may communicate with a camera 1102B. The camera 1102B may include a pre-configured security relation with the security company 1116 such as KDC. After installing the wireless camera 1102B at home, the end-user client 1108B may connect to the camera 1102B using an end-to-end security connection 1114B by contacting the security company 1116 asking for the session-key material to secure the communication as described herein.

The end-user client 1108B may trust the security company 1116 to handle end-to-end security keys on behalf of the end-user client 1108B. The end-user client 1108B may trust the security company 1116 that the security company 1116 may not use the keys for an unsolicited purposes. For flexibility and ease of installation, the surveillance cameras 1102A-C that are used by the end-user client 1108A-C may be battery driven and/or connected to the user's home WLAN 1104A-C.

An attacker may attack IoT units by pretending to set up secure communications with the IoT units. For example, FIG. 11B illustrates a DoS attack. In FIG. 11B, the attacker 1118 may determine to send a request 1120 to the surveillance camera 1102C on the home network 1104C. The attacker 1118 may pretend to set up secure video sessions with the surveillance camera 1102C. The attack may or may not give the attacker access to the surveillance camera 1102C or secure video stream 1114C sent from the camera. The attack may drain the battery of the surveillance camera 1102C and make it inoperable. The attack may lead to traffic blocking. For example, the surveillance camera 1102C or the end-user client 1108C may include a strict DoS filter. The DoS filter may block traffic towards the surveillance camera under attack 1102C, including traffic from legitimate clients. The attack may make the camera inoperable. For example, the surveillance camera under attack 1102C may become inoperable if the attacker keeps sending a request to the surveillance camera 1102C pretending to set up secure video sessions with the surveillance camera 1102C.

Protection provided through the GW may prevent the problems described herein. An operator network 1112 may include a DoS filtering service (e.g., the GW 1110 in its network). Potential sensitive information such as secret session keys and a master key may or may not be given to the operator network 1112. The DoS filtering service may protect the surveillance cameras 1102A-C from the DoS attack described herein. The surveillance camera under attack 1102C may detect a large number of false session set-up requests from the Internet 1105. The surveillance camera under attack 1102C may contact the GW 1110 in the operator network 1112. The surveillance camera 1102C may ask the GW 1110 in the operator network 1112 to deploy a DoS filter for traffic directed towards the surveillance camera 1102C in the home network 1104C. The surveillance camera 1102C may ask the GW 1110 in the operator network 1112 to deploy a DoS filter for traffic targeting the home network 1104C. The surveillance camera 1102C may give the GW 1110 parameters that allow the GW 1110 to distinguish valid message ID from non-valid message ID according to the security policy of the surveillance camera 1102C and processes/approaches described herein. The GW 1110 may be able to apply a DoS filter without knowing secret session keys that may be used by the surveillance camera 1102C and the end-user client 1108C. The GW 1110 may be able to apply a DoS filter without knowing a master key shared between the security company 1116 and the surveillance camera 1102C. The GW 1110 may start deploying the DoS filter and may allow IP packets with valid message ID/sequence numbers to be passed to the surveillance camera 1102C. The attacker 1118 may or may not be able to find valid message ID ranges, for example, without intercepting traffic 1114C from the non-attacker end-user client 1108C towards the surveillance camera 1102C. A majority of DoS attack packets 1120 may be blocked without reaching the surveillance camera 1102C. The non-attacker end-user client 1108C may be able to calculate valid message IDs and may be allowed to communicate with surveillance camera 1102C securely while the DoS attack may be ongoing.

Figure 12A:
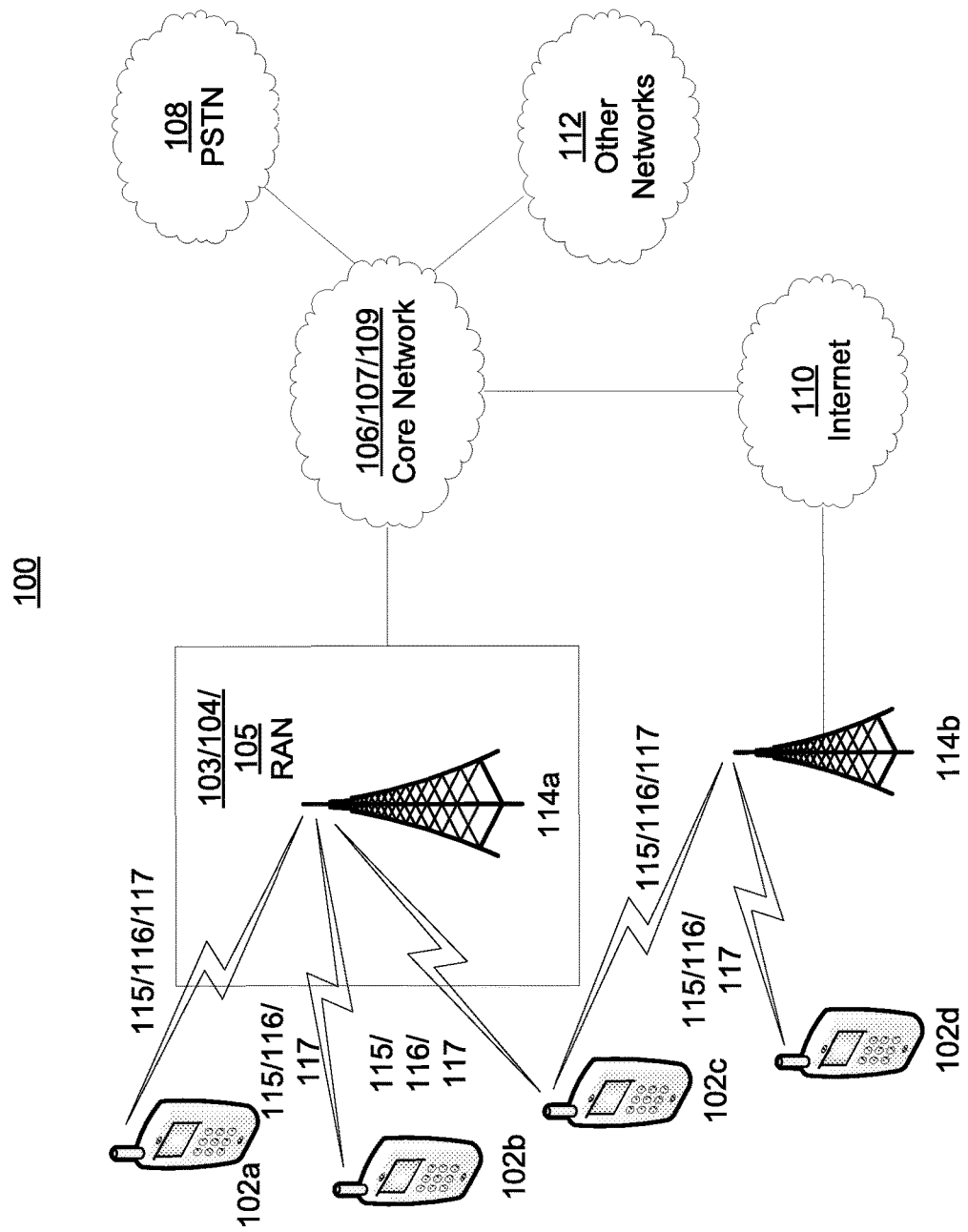
FIG. 12A depicts a diagram of an example communications system in which one or more disclosed examples may be implemented and/or may be used with one or more of the examples described herein.

FIG. 12A depicts a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access approaches, such as code division multiple access (CDMA), time division multiple access (TDMA), frequency division multiple access (FDMA), orthogonal FDMA (OFDMA), single-carrier FDMA (SC-FDMA), and the like.

As shown in FIG. 12A, the communications system 100 may include wireless transmit/receive units (WTRUs) 102a, 102b, 102c, and/or 102d (which generally or collectively may be referred to as WTRU 102), a radio access network (RAN) 103/104/105, a core network 106/107/109, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, and/or 102d may be any type of device configured to operate and/or communicate in a wireless environment. By way of example, the WTRUs 102a, 102b, 102c, and/or 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, and/or 102d to facilitate access to one or more communication networks, such as the core network 106/107/109, the Internet 110, and/or the networks 112. By way of example, the base stations 114a and/or 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a and/or 114b may communicate with one or more of the WTRUs 102a, 102b, 102c, and/or 102d over an air interface 115/116/117, which may be any suitable wireless communication link (e.g., radio frequency (RF), microwave, infrared (IR), ultraviolet (UV), visible light, etc.). The air interface 115/116/117 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, and/or 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, and/or 102c may implement a radio technology such as Evolved UMTS Terrestrial Radio Access (E-UTRA), which may establish the air interface 115/116/117 using Long Term Evolution (LTE) and/or LTE-Advanced (LTE-A).

In other embodiments, the base station 114a and the WTRUs 102a, 102b, and/or 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 12A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 12A, the base station 114b may have a direct connection to the Internet 110. Thus, the base station 114b may not be required to access the Internet 110 via the core network 106/107/109.

The RAN 103/104/105 may be in communication with the core network 106/107/109, which may be any type of network configured to provide voice, data, applications, and/or voice over internet protocol (VoIP) services to one or more of the WTRUs 102a, 102b, 102c, and/or 102d. For example, the core network 106/107/109 may provide call control, billing services, mobile location-based services, pre-paid calling, Internet connectivity, video distribution, etc., and/or perform high-level security functions, such as user authentication. Although not shown in FIG. 12A, it will be appreciated that the RAN 103/104/105 and/or the core network 106/107/109 may be in direct or indirect communication with other RANs that employ the same RAT as the RAN 103/104/105 or a different RAT. For example, in addition to being connected to the RAN 103/104/105, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, and/or 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 or a different RAT.

Some or all of the WTRUs 102a, 102b, 102c, and/or 102d in the communications system 100 may include multi-mode capabilities, i.e., the WTRUs 102a, 102b, 102c, and/or 102d may include multiple transceivers for communicating with different wireless networks over different wireless links. For example, the WTRU 102c shown in FIG. 12A may be configured to communicate with the base station 114a, which may employ a cellular-based radio technology, and with the base station 114b, which may employ an IEEE 802 radio technology.

Figure 12B:
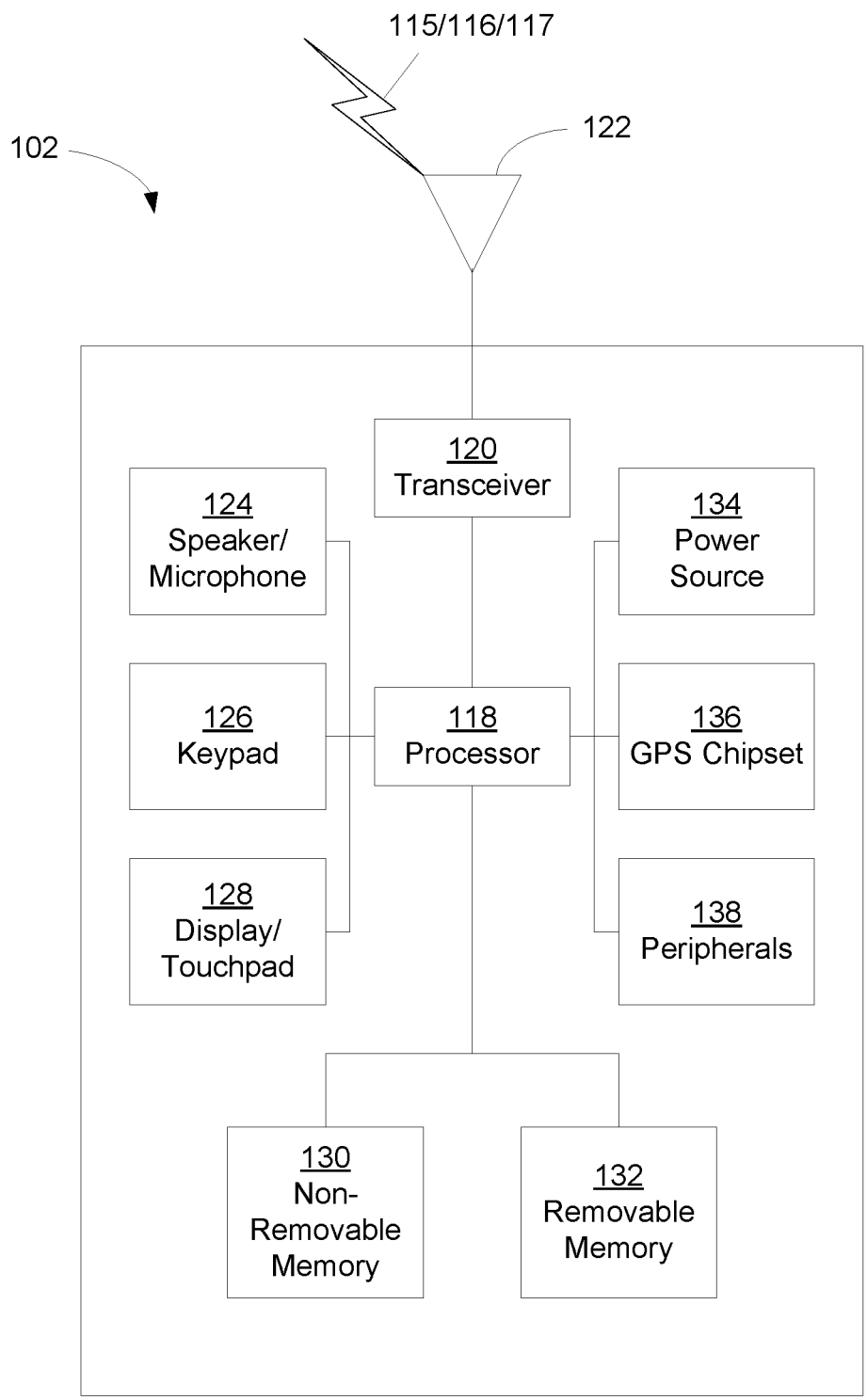
FIG. 12B depicts a system diagram of an example device such as a wireless transmit/receive unit (WTRU), server, database, and/or the like that may be used within the communications system illustrated in FIG. 12A.

FIG. 12B depicts a system diagram of an example WTRU 102. As shown in FIG. 12B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any subcombination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 12B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 12B depicts the processor 118 and the transceiver 120 as separate components, it may be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 12B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 12C:
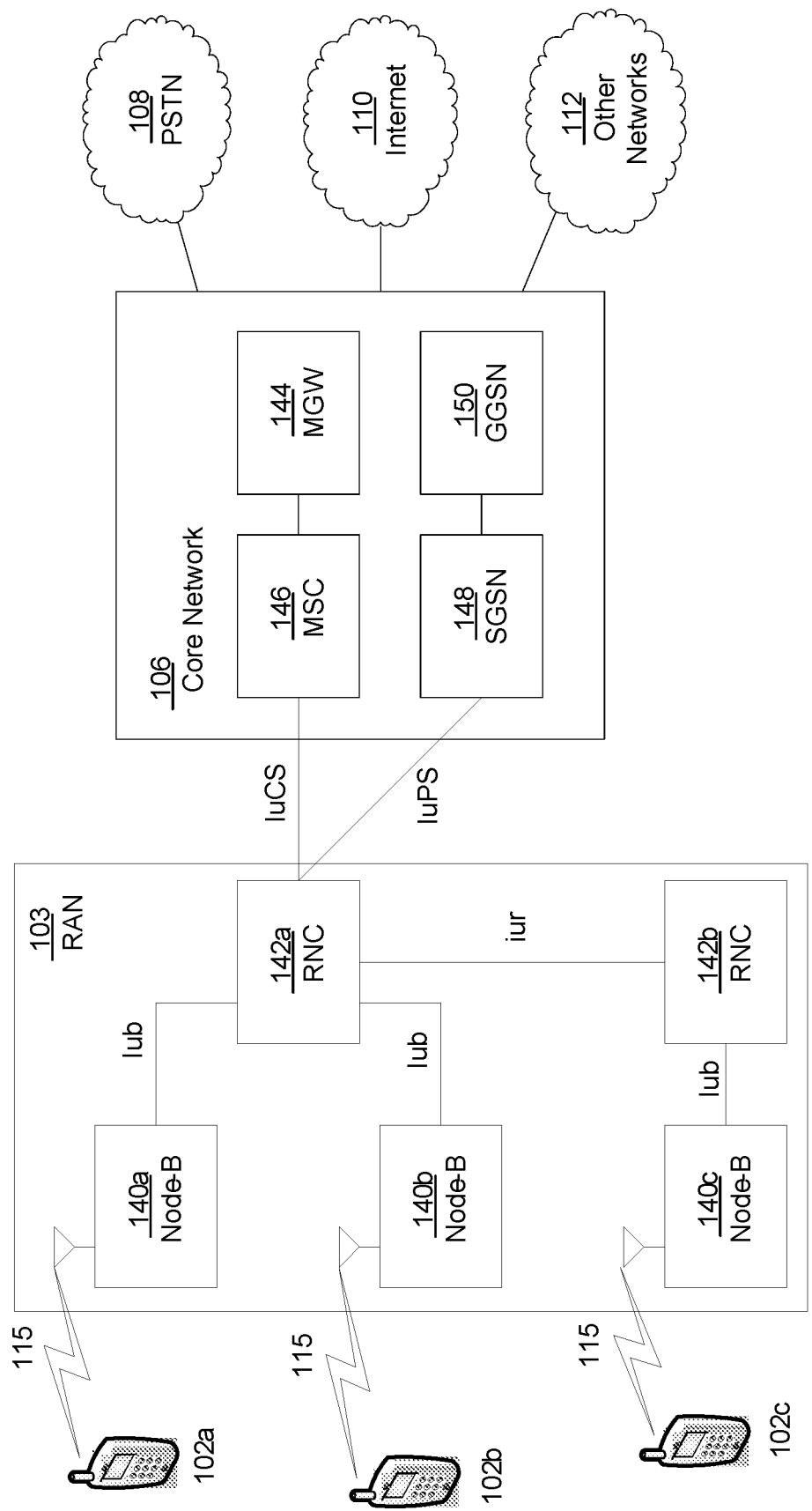
FIG. 12C depicts a system diagram of an example radio access network and an example core network that may be used within the communications system illustrated in FIG. 12A.

FIG. 12C depicts a system diagram of the RAN 103 and the core network 106 according to an embodiment. As noted above, the RAN 103 may employ a UTRA radio technology to communicate with the WTRUs 102a, 102b, and/or 102c over the air interface 115. The RAN 103 may also be in communication with the core network 106. As shown in FIG. 12C, the RAN 103 may include Node-Bs 140a, 140b, and/or 140c, which may each include one or more transceivers for communicating with the WTRUs 102a, 102b, and/or 102c over the air interface 115. The Node-Bs 140a, 140b, and/or 140c may each be associated with a particular cell (not shown) within the RAN 103. The RAN 103 may also include RNCs 142a and/or 142b. It will be appreciated that the RAN 103 may include any number of Node-Bs and RNCs while remaining consistent with an embodiment.

As shown in FIG. 12C, the Node-Bs 140a and/or 140b may be in communication with the RNC 142a. Additionally, the Node-B 140c may be in communication with the RNC 142b. The Node-Bs 140a, 140b, and/or 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, and/or 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106 shown in FIG. 12C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, and/or 102c with access to circuit-switched networks, such as the PSTN 108, to facilitate communications between the WTRUs 102a, 102b, and/or 102c and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, and/or 102c with access to packet-switched networks, such as the Internet 110, to facilitate communications between and the WTRUs 102a, 102b, and/or 102c and IP-enabled devices.

As noted above, the core network 106 may also be connected to the networks 112, which may include other wired or wireless networks that are owned and/or operated by other service providers.

Figure 12D:
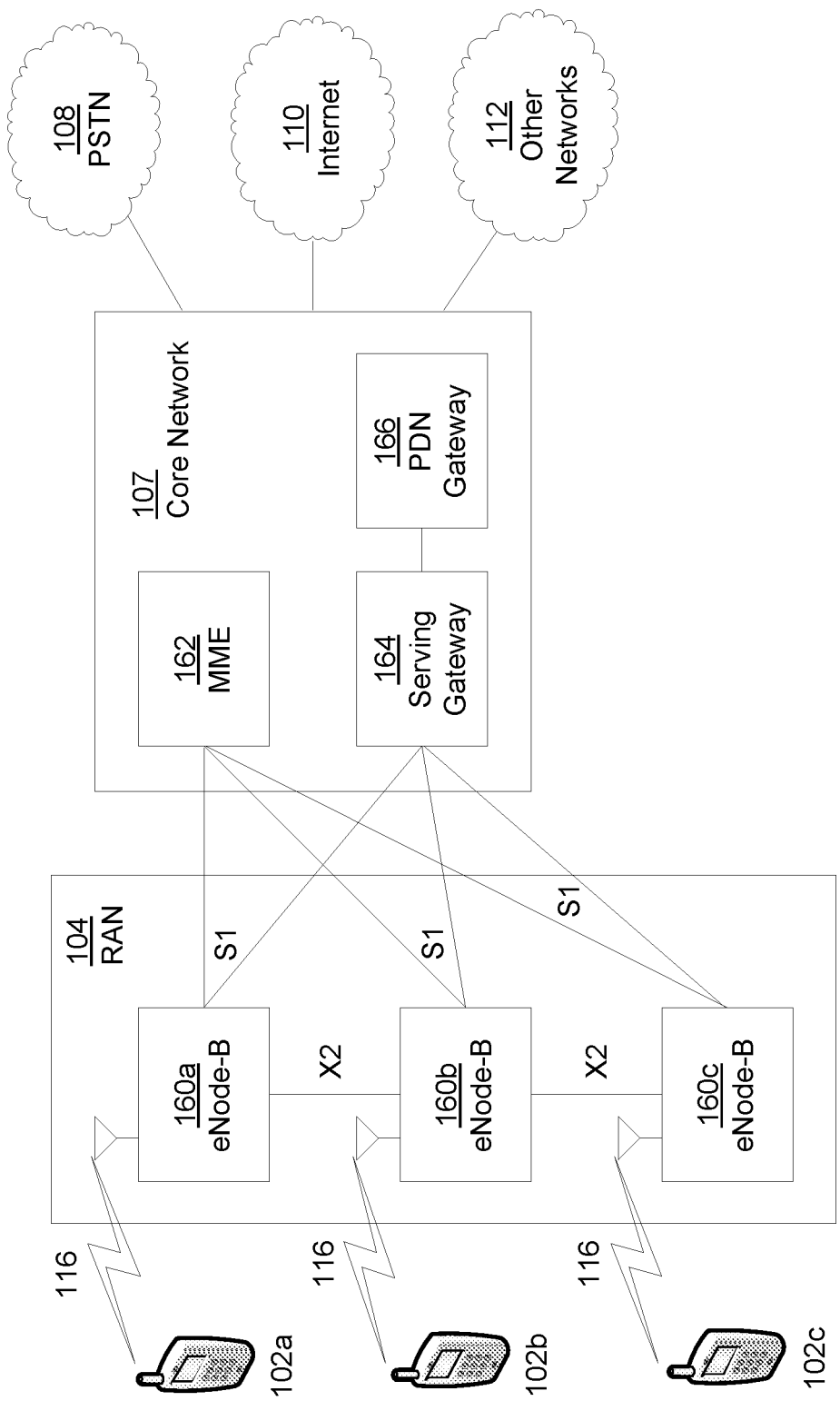
FIG. 12D depicts a system diagram of another example radio access network and an example core network that may be used within the communications system illustrated in FIG. 12A.

FIG. 12D depicts a system diagram of the RAN 104 and the core network 107 according to an embodiment. As noted above, the RAN 104 may employ an E-UTRA radio technology to communicate with the WTRUs 102a, 102b, and/or 102c over the air interface 116. The RAN 104 may also be in communication with the core network 107.

The RAN 104 may include eNode-Bs 160a, 160b, and/or 160c, though it will be appreciated that the RAN 104 may include any number of eNode-Bs while remaining consistent with an embodiment. The eNode-Bs 160a, 160b, and/or 160c may each include one or more transceivers for communicating with the WTRUs 102a, 102b, and/or 102c over the air interface 116. In one embodiment, the eNode-Bs 160a, 160b, and/or 160c may implement MIMO technology. Thus, the eNode-B 160a, for example, may use multiple antennas to transmit wireless signals to, and receive wireless signals from, the WTRU 102a.

Each of the eNode-Bs 160a, 160b, and/or 160c may be associated with a particular cell (not shown) and may be configured to handle radio resource management decisions, handover decisions, scheduling of users in the uplink and/or downlink, and the like. As shown in FIG. 12D, the eNode-Bs 160a, 160b, and/or 160c may communicate with one another over an X2 interface.

The core network 107 shown in FIG. 12D may include a mobility management gateway (MME) 162, a serving gateway 164, and a packet data network (PDN) gateway 166.

While each of the foregoing elements are depicted as part of the core network 107, it will be appreciated that any one of these elements may be owned and/or operated by an entity other than the core network operator.

The MME 162 may be connected to each of the eNode-Bs 160a, 160b, and/or 160c in the RAN 104 via an S1 interface and may serve as a control node. For example, the MME 162 may be responsible for authenticating users of the WTRUs 102a, 102b, and/or 102c, bearer activation/deactivation, selecting a particular serving gateway during an initial attach of the WTRUs 102a, 102b, and/or 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, and/or 160c in the RAN 104 via the S1 interface. The serving gateway 164 may generally route and forward user data packets to/from the WTRUs 102a, 102b, and/or 102c. The serving gateway 164 may also perform other functions, such as anchoring user planes during inter-eNode B handovers, triggering paging when downlink data is available for the WTRUs 102a, 102b, and/or 102c, managing and storing contexts of the WTRUs 102a, 102b, and/or 102c, and the like.

The serving gateway 164 may also be connected to the PDN gateway 166, which may provide the WTRUs 102a, 102b, and/or 102c with access to packet-switched networks, such as the Internet 110, to facilitate communications between the WTRUs 102a, 102b, and/or 102c and IP-enabled devices.

The core network 107 may facilitate communications with other networks. For example, the core network 107 may provide the WTRUs 102a, 102b, and/or 102c with access to circuit-switched networks, such as the PSTN 108, to facilitate communications between the WTRUs 102a, 102b, and/or 102c and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, and/or 102c with access to the networks 112, which may include other wired or wireless networks that are owned and/or operated by other service providers.

Figure 12E:
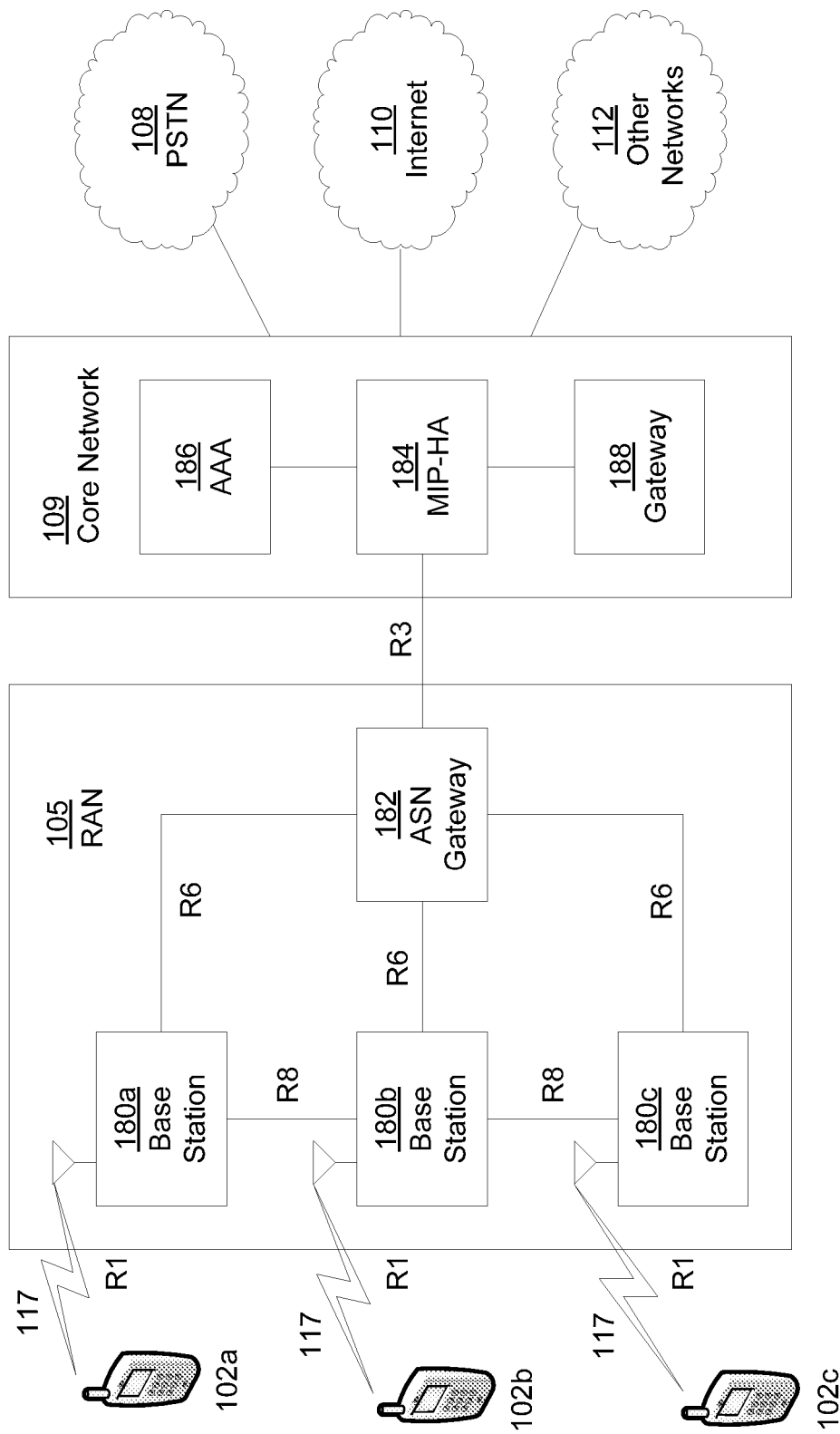
FIG. 12E depicts a system diagram of another example radio access network and an example core network that may be used within the communications system illustrated in FIG. 12A.

FIG. 12E depicts a system diagram of the RAN 105 and the core network 109 according to an embodiment. The RAN 105 may be an access service network (ASN) that employs IEEE 802.16 radio technology to communicate with the WTRUs 102a, 102b, and/or 102c over the air interface 117. As will be further discussed below, the communication links between the different functional entities of the WTRUs 102a, 102b, and/or 102c, the RAN 105, and the core network 109 may be defined as reference points.

As shown in FIG. 12E, the RAN 105 may include base stations 180a, 180b, and/or 180c, and an ASN gateway 182, though it will be appreciated that the RAN 105 may include any number of base stations and ASN gateways while remaining consistent with an embodiment. The base stations 180a, 180b, and/or 180c may each be associated with a particular cell (not shown) in the RAN 105 and may each include one or more transceivers for communicating with the WTRUs 102a, 102b, and/or 102c over the air interface 117. In one embodiment, the base stations 180a, 180b, and/or 180c may implement MIMO technology. Thus, the base station 180a, for example, may use multiple antennas to transmit wireless signals to, and receive wireless signals from, the WTRU 102a. The base stations 180a, 180b, and/or 180c may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, and/or 102c and the RAN 105 may be defined as an R1 reference point that implements the IEEE 802.16 specification. In addition, each of the WTRUs 102a, 102b, and/or 102c may establish a logical interface (not shown) with the core network 109. The logical interface between the WTRUs 102a, 102b, and/or 102c and the core network 109 may be defined as an R2 reference point, which may be used for authentication, authorization, IP host configuration management, and/or mobility management.

The communication link between each of the base stations 180a, 180b, and/or 180c may be defined as an R8 reference point that includes protocols for facilitating WTRU handovers and the transfer of data between base stations. The communication link between the base stations 180a, 180b, and/or 180c and the ASN gateway 182 may be defined as an R6 reference point. The R6 reference point may include protocols for facilitating mobility management based on mobility events associated with each of the WTRUs 102a, 102b, and/or 102c.

As shown in FIG. 12E, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102a, 102b, and/or 102c to roam between different ASNs and/or different core networks. The MIP-HA 184 may provide the WTRUs 102a, 102b, and/or 102c with access to packet-switched networks, such as the Internet 110, to facilitate communications between the WTRUs 102a, 102b, and/or 102c and IP-enabled devices. The AAA server 186 may be responsible for user authentication and for supporting user services. The gateway 188 may facilitate interworking with other networks. For example, the gateway 188 may provide the WTRUs 102a, 102b, and/or 102c with access to circuit-switched networks, such as the PSTN 108, to facilitate communications between the WTRUs 102a, 102b, and/or 102c and traditional land-line communications devices. In addition, the gateway 188 may provide the WTRUs 102a, 102b, and/or 102c with access to the networks 112, which may include other wired or wireless networks that are owned and/or operated by other service providers.

Although not shown in FIG. 12E, it should, may, and/or will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102a, 102b, and/or 102c between the RAN 105 and the other ASNs. The communication link between the core network 109 and the other core networks may be defined as an R5 reference, which may include protocols for facilitating interworking between home core networks and visited core networks.

Although the terms device, M2M, unit, IoT, UE, and/or WTRU may be used herein, it may and should be understood that the use of such terms may be used interchangeably and, as such, may not be distinguishable.

Further, although features and elements are described above in particular combinations, one of ordinary skill in the art will appreciate that each feature or element can be used alone or in any combination with the other features and elements. In addition, the systems, methods, and/or instrumentalities described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A gateway device for mitigating an attack, the gateway device comprising:
    a transceiver; and
    a processor configured to:
        receive a first communication directed to an Internet of Things (IoT) device;
        send the first communication to the IoT device;
        receive from the IoT device:
            an indication that the first communication is associated with an attack; and
            a request to change a filtering rule set at the gateway device;
        make a first change to the filtering rule set at the gateway device;
        receive a second communication directed to the IoT device; and
        send the second communication to the IoT device if a plurality of conditions are met, wherein the plurality of conditions include that the second communication is valid based on the filtering rule set with the first change and a number of valid packets is less than a value.

2. The gateway device of claim 1, wherein the processor is further configured to:
    on a condition that the number of valid packets exceeds the value, make a second change to the filtering rule set at the gateway device, wherein the filtering rule set with the second change is more restrictive than the filtering rule set with the first change.

3. The gateway device of claim 2, wherein the processor is further configured to:
    on a condition that the number of valid packets exceeds the value, send a warning to an IoT device management system.

4. The gateway device of claim 1, wherein the valid packets have valid internet protocol (IP) addresses, and wherein the valid IP addresses meet a requirement of the IoT device according to a list comprising a source IP address.

5. The gateway device of claim 1, wherein, when session key sharing is allowed, the processor is further configured to share a session key with the IoT device.

6. The gateway device of claim 1, wherein the processor is further configured to receive a set of parameters from the IoT device, and wherein the set of parameters is associated with a determination of a validity of a packet.

7. The gateway device of claim 1, wherein the processor is further configured to store each valid packet in a buffer queue and update the buffer queue based on an algorithm.

8. The gateway device of claim 1, wherein the processor is further configured to receive a sleep time period associated with the IoT device, and wherein the plurality of conditions includes the sleep time period having expired.

9. An Internet of Things (IoT) device for mitigating an attack, the IoT device comprising:
a transceiver; and
a processor configured to:
receive a first communication from a gateway device;
determine that the IoT device is under an attack;
send to the gateway device, based on the determination that the IoT device is under the attack, a request to change a filtering rule set at the gateway device;
enter a sleep mode, wherein the IoT device does not process a communication from the gateway device;
enter an active mode; and
receive a second communication from the gateway device.

10. The IoT device of claim 9, wherein the processor is further configured to determine that the first communication is associated with the attack on the IoT device, and wherein the determination that the first communication is associated with the attack on the IoT device comprises a determination that a number of packets received by the IoT device during a time period exceeds a value.

11. The IoT device of claim 10, wherein, when session key sharing is allowed, the IoT device configured to receive a session key from the gateway device.

12. The IoT device of claim 10, wherein the request comprises a parameter associated with a determination of communication validity.

13. The IoT device of claim 10, wherein the request comprises the value.

14. The IoT device of claim 10, wherein the request comprises a list of source internet protocol (IP) addresses, and wherein the source IP addresses are for sources of communications not meeting a requirement of the IoT device.

15. The IoT device of claim 10, wherein the processor is further configured to record a number of valid packets per second, and wherein the determination that the first communication is associated with the attack on the IoT device is based on the number of valid packets per second.

16. The IoT device of claim 10, wherein the processor is further configured to receive a sleep time period and remain in the sleep mode until the sleep time period expires.

17. The IoT device of claim 10, wherein the IoT device determines the filtering rule set based on a valid or non-valid message identification, and wherein the valid or non-valid message identification is a constrained application protocol (CoAP) message identification.

18. The IoT device of claim 10, wherein the processor is further configured to determine the filtering rule set based on a message sequence number.

19. A method performed by an Internet of Things (IoT) device for mitigating an attack, comprising:
receiving a first communication from a gateway device;
determining that the IoT device is under an attack;
sending to the gateway device, based on the determination that the IoT device is under the attack, a request to change a filtering rule set at the gateway device;
entering a sleep mode, wherein the IoT device does not process a communication from the gateway device;
entering an active mode; and
receiving a second communication from the gateway device.

20. The method of claim 19, further comprising determining that the first communication is associated with the attack on the IoT device, wherein the determination that the first communication is associated with the attack on the IoT device comprises determining that a number of packets received by the IoT device during a time period exceeds a value.

* * * * *